United States Patent
Acero Acero et al.

(10) Patent No.: US 12,150,225 B2
(45) Date of Patent: Nov. 19, 2024

(54) INDUCTION ENERGY TRANSMISSION SYSTEM

(71) Applicant: BSH Hausgeräte GmbH, Munich (DE)

(72) Inventors: Jesus Acero Acero, Saragossa (ES); Claudio Carretero Chamarro, Saragossa (ES); Pablo Jesus Hernandez Blasco, Saragossa (ES); Sergio Llorente Gil, Saragossa (ES); Ignacio Lope Moratilla, Saragossa (ES); Javier Serrano Trullen, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 1011 days.

(21) Appl. No.: 17/049,975

(22) PCT Filed: Apr. 29, 2019

(86) PCT No.: PCT/IB2019/053476
§ 371 (c)(1),
(2) Date: Dec. 16, 2020

(87) PCT Pub. No.: WO2019/211717
PCT Pub. Date: Nov. 7, 2019

(65) Prior Publication Data
US 2021/0185773 A1 Jun. 17, 2021

(30) Foreign Application Priority Data
May 4, 2018 (ES) .................. P201830432

(51) Int. Cl.
*H05B 6/06* (2006.01)
*H05B 6/12* (2006.01)

(52) U.S. Cl.
CPC ........... *H05B 6/065* (2013.01); *H05B 6/1272* (2013.01); *H05B 2213/03* (2013.01)

(58) Field of Classification Search
CPC .... H05B 6/1272; H05B 6/1245; H05B 6/065; H05B 2213/03; Y02B 40/00
See application file for complete search history.

(56) References Cited

U.S. PATENT DOCUMENTS 6,498,325 B1 * 12/2002 Akel .................... H05B 6/1218
219/673
2015/0237682 A1 8/2015 Cem et al.
(Continued)

FOREIGN PATENT DOCUMENTS

CN 07734732 A 2/2018
EP 1858300 A1 11/2007
(Continued)

OTHER PUBLICATIONS

National Receipt Search Report ES P201830432 dated Dec. 19, 2018.
(Continued)

*Primary Examiner* — Dana Ross
*Assistant Examiner* — Kuangyue Chen
(74) *Attorney, Agent, or Firm* — Michael E. Tschupp; Andre Pallapies; Brandon G. Braun

(57) ABSTRACT

An induction energy transmission system includes a supply unit having a supplying induction element for supplying energy, and a receiving unit having a receiving induction element that receives energy from the supplying induction element when in an operational state a shortest connection between the supplying induction element and the receiving induction element is minimal. The supplying induction element has a sub-region which, in the operational state, is oriented at an angle relative to a plane that is at least substantially perpendicular to the shortest connection between the supplying induction element and the receiving induction element.

19 Claims, 15 Drawing Sheets

(56) References Cited

U.S. PATENT DOCUMENTS

2015/0332845 A1  11/2015  Werner et al.
2018/0003682 A1   1/2018  Acero Acero et al.
2018/0368214 A1* 12/2018  Acero Acero ........... H05B 6/44

FOREIGN PATENT DOCUMENTS

EP      3383140 A1   10/2018
WO   2010148546 A1   12/2010

OTHER PUBLICATIONS

PCT Receipt International Search Report PCT/IB2019/053476 dated Jul. 10, 2019.

* cited by examiner

INDUCTION ENERGY TRANSMISSION SYSTEM

CROSS-REFERENCES TO RELATED APPLICATIONS

This application is the U.S. National Stage of International Application No. PCT/IB2019/053476, filed Apr. 29, 2019, which designated the United States and has been published as International Publication No. WO 2019/211717 A1 and which claims the priority of Spanish Patent Application, Serial No. P201830432, filed May 4, 2018, pursuant to 35 U.S.C. 119(a)-(d).

BACKGROUND OF THE INVENTION

The invention relates to an induction energy transmission system and a method for an operation of an induction energy transmission system.

An induction energy transmission system which has a supply unit and a receiving unit is already disclosed in the international patent application WO 2016/185303 A1. In an operational state a supplying induction element of the supply unit provides energy for the receiving unit. In the operational state in which a shortest connection between the supplying induction element and the receiving induction element is minimal, a receiving induction element of the receiving unit receives energy from the supplying induction element. In each case the supplying induction element and the receiving induction element only have sub-regions and/or portions with a principal extension plane which is oriented substantially parallel to a plane which is oriented substantially perpendicular to the shortest connection between the supplying induction element and the receiving induction element.

BRIEF SUMMARY OF THE INVENTION

The object of the invention, in particular, is to provide a generic system with improved properties regarding energy transmission.

The invention is based on an induction energy transmission system, in particular an induction cooking system, and advantageously an induction hob system, comprising at least one supply unit that has at least one supplying induction element provided to supply energy, and at least one receiving unit which comprises at least one receiving induction element that receives energy from said supplying induction element when in at least one operational state in which a shortest connection between the supplying induction element and the receiving induction element is minimal and, in particular, defines a minimal distance between the supplying induction element and the receiving induction element.

It is proposed that the supplying induction element comprises at least one sub-region which, in the operational state, is oriented at an angle relative to a plane that is at least substantially perpendicular to the shortest connection between the supplying induction element and the receiving induction element and which is arranged, in particular, between the supplying induction element and the receiving induction element.

By means of the embodiment according to the invention, in particular, an optimized and/or efficient energy transmission may be achieved. In particular, a high level of flexibility may be possible regarding an arrangement of the supplying induction element. In particular, a compact embodiment may be achieved. In particular, if the supply unit has at least two supplying induction elements, in particular, an overlapping arrangement of the supplying induction elements may be possible by means of the sub-region, whereby in particular a compact and/or space-saving embodiment may be achieved.

An "induction energy transmission system", in particular an "induction cooking system" and advantageously an "induction hob system", is intended to be understood, in particular, as a system which has at least one supply unit, in particular at least one induction cooking device and advantageously at least one induction hob, and which has a principal function in the form of energy transmission. For example, the induction energy transmission system could be configured as an induction handheld power tool system. In particular, the supply unit and/or the receiving unit could be configured as a hand-held power tool, such as for example a drill and/or an electric screwdriver and/or a hammer drill and/or a saw. Alternatively or additionally, the supply unit and/or the receiving unit could be configured as a transformer. The induction energy transmission system could be provided, in particular, for at least one self-propelled implement and/or for at least a remote control and/or for at least a remote operation. In particular, the receiving unit could be configured as a self-propelled implement and/or as a remote control and/or as a remote operation. The self-propelled implement could be configured, for example, as a self-propelled lawn mower and/or as a self-propelled vacuum cleaner. The remote control and/or the remote operation could be provided, in particular, for an operation and/or for a control of at least one shutter and/or at least one electric appliance, in particular at least one household electric appliance and/or at least one model object, such as for example a model car and/or a model aircraft and/or a model boat. Preferably, the induction energy transmission system is configured as an induction cooking system. For example, the induction energy transmission system could be configured as an induction oven system and/or as an induction grill system. In particular, the supply unit and/or the receiving unit could be configured as an induction oven and/or as an induction grill. Advantageously the induction energy transmission system is configured as an induction hob system. The supply unit and/or the receiving unit is configured, in particular, as an induction hob.

A "supply unit" is intended to be understood, in particular, as a unit which in at least one operational state inductively provides energy and which, in particular, has a principal function in the form of providing energy. For providing energy the supply unit has, in particular, at least one supplying induction element which has, in particular, at least one coil, in particular has at least one primary coil and which provides energy, in particular inductively, in the operational state.

An "induction element" is intended to be understood, in particular, as an element which in at least one operational state provides and/or receives energy, in particular for the purpose of an inductive energy transmission. In particular, in the operational state an induction element configured as a supplying induction element provides energy, in particular for the purpose of an inductive energy transmission. The supplying induction element could have, in particular, at least one coil, in particular at least one primary coil, which in particular could be provided for an inductive energy transmission to at least one secondary coil. The secondary coil could, for example, be part of the receiving unit, in particular at least one receiving induction element of the receiving unit. In particular, in the operational state an induction element configured as a receiving induction element receives energy, in particular for the purpose of an inductive energy transmission and, in particular from the supplying induction element. The receiving induction element could have, in particular, at least one coil, in particular at least one secondary coil, which in particular could be provided for receiving inductive energy from the supplying induction element.

For example, the induction element could be configured in at least two parts and in particular in multiple parts. Preferably, the induction element is configured in one piece and/or integrally. "Integrally" is intended to be understood, in particular, as at least connected by a material connection, for example by a welding process, a bonding process, an injection-molding process and/or a further process appearing meaningful to the person skilled in the art, and/or advantageously formed in one piece, such as for example by producing from a cast part and/or by producing in a single-component or multi-component injection-molding method and advantageously from a single blank.

The supplying induction element could, for example, be configured as a transformer. Alternatively or additionally, the supplying induction element, in particular, could be configured as an induction heating element and, in particular, provided for energy transmission to at least one receiving unit configured as positioning unit, in particular for the purpose of heating the positioning unit. In at least one operational state the supplying induction element could provide, in particular, an alternating field, in particular an electromagnetic alternating field, with a frequency of at least 1 Hz, in particular of at least 2 Hz, advantageously of at least 5 Hz and preferably of at least 10 Hz. In particular, in at least one operational state the supplying induction element could provide, in particular, an alternating field, in particular an electromagnetic alternating field with at frequency of a maximum of 150 kHz, in particular a maximum of 120 kHz, advantageously a maximum of 100 kHz and preferably a maximum of 80 kHz. In at least one operational state a supplying induction element which is configured, in particular, as an induction heating element could provide in particular a high frequency alternating field, in particular a high frequency electromagnetic alternating field, with a frequency of at least 15 kHz and in particular a maximum of 100 kHz.

For example the supply unit could have just one supplying induction element. The supply unit could have, for example, at least two, in particular at least three, advantageously at least four, particularly advantageously at least five, preferably at least eight and particularly preferably a plurality of supplying induction elements which, in particular, in the operational state in each case could provide inductive energy and in particular to an in particular single receiving unit or to at least two receiving units. In particular, any of the supplying induction elements could be arranged, in particular, in the vicinity of at least one further supplying induction element. At least one portion of the supplying induction elements could be arranged, for example, in a row and/or in the shape of a matrix.

A "receiving unit" is intended to be understood, in particular, as a unit which in at least one operational state inductively receives energy and which in particular has a principal function in the form of receiving energy. The receiving unit could have, for example, at least one consumer which in the operational state could consume, in particular, energy. The receiving unit could, for example, a hand-held power tool, such as for example a drill and/or an electric screwdriver and/or a hammer drill and/or a saw, and/or a vehicle and/or a mobile device, such as for example a laptop and/or a tablet and/or a mobile telephone, and/or a remote control and/or a remote operation and/or a self-propelled implement. For example, the energy received by the receiving unit in the operational state, in particular, could be directly converted into at least one further energy form, such as for example into heat. The receiving induction element could have, for example, at least one coil, in particular at least one secondary coil.

An "operational state" is intended to be understood in this case and hereinafter as a functionally coupled state in which a shortest connection between the supplying induction element and the receiving induction element is minimal and in which the supplying induction element, in particular, inductively transmits energy to the receiving induction element and in which, in particular, the supplying induction element and the receiving induction element are functionally coupled together. Advantageously in the operational state the supplying induction element and the receiving induction element, when viewed perpendicular to the plane, are arranged at least partially and advantageously at least for the most part so as to overlap. "At least for the most part" is intended to be understood, in particular, as in a proportion, in particular a mass portion and/or volume portion, of at least 70%, in particular of at least 80%, advantageously of at least 90% and preferably of at least 95%.

In the operational state, the shortest connection between the supplying induction element and the receiving induction element connects together, in particular, a region of the supplying induction element closest to the receiving induction element and a region of the receiving induction element closest to the supplying induction element. Advantageously, in the operational state the shortest connection between the supplying induction element and the receiving induction element connects together a central point and/or center of gravity of the supplying induction element and a central point and/or center of gravity of the receiving induction element.

For example, the supplying induction element could exclusively comprise the sub-region. Alternatively, the supplying induction element, in particular, could have at least one further sub-region, in particular in addition to the sub-region. In particular, the sub-region and the further sub-region could be arranged in different alignments and/or orientations relative to the plane and, in particular, enclose with the plane different minimum angles. For example, the further sub-region could be at least partially, in particular at least for the most part, and advantageously entirely identical to at least one first portion and/or to at least one second portion of the supplying induction element.

The phrase that an object in the operational state is arranged "at an angle" relative to a plane is intended to be understood, in particular, that in the operational state the object encloses with the plane a minimum angle of more than 0° and a maximum of 90°. In particular, in the operational state the object encloses with the plane a minimum angle of at least 5°, in particular of at least 10°, advantageously of at least 15°, particularly advantageously of at least 20°, preferably of at least 25° and particularly preferably of at least 30°. In particular, in the operational state the object encloses with the plane a minimum angle of a maximum of 85°, in particular a maximum of 80°, advantageously a maximum of 75°, particularly advantageously a maximum of 70°, preferably a maximum of 65° and particularly preferably a maximum of 60°. The expression "substantially perpendicular" in this case is intended to define, in particular, an orientation of a direction relative to a reference direction, wherein the direction and the reference direction, in particular viewed in one plane, enclose an angle of 90°, and the angle has a maximum deviation of in particular less than 8°, advantageously of less than 5° and particularly advantageously of less than 2°.

The supply unit has, in particular, at least one positioning plate which is provided, in particular, for positioning a positioning unit which is configured as a positioning unit. A "positioning plate" is intended to be understood, in particular, as at least one, in particular, plate-like unit which is provided for positioning at least one receiving unit configured as a positioning unit, in particular for the purpose of energy transmission to the receiving unit. For example, the positioning plate could be configured as a substrate, in particular a base and/or a floor. The positioning plate could alternatively or additionally be configured, for example, as a sub-region of at least one worktop, in particular at least one kitchen worktop, in particular of the supply unit. Alternatively or additionally, the positioning plate could be configured as a hob plate. The positioning plate which is configured as a hob plate could form, in particular, at least one part of a hob external housing and, in particular, together with at least one external housing unit, to which the positioning plate which is configured as a hob plate could be connected in particular in at least one assembled state, could form the hob external housing at least for the most part. The positioning plate could be formed, for example at least for the most part, from glass and/or from glass ceramics and/or from neolith and/or from Dekton and/or from wood and/or from marble and/or from stone, in particular from natural stone, and/or from laminate and/or from metal and/or from plastic and/or from ceramic.

In the operational state, the positioning plate in particular forms the plane. The plane, in particular, is identical to a principal extension plane of the positioning plate. A "principal extension plane" of an object is intended to be understood, in particular, as a plane which is parallel to a largest side surface of a smallest imaginary geometric cuboid which only just fully encloses the object and runs through the central point of the cuboid.

In particular, the sub-region has at least one principal extension plane which is oriented at an angle relative to the principal extension plane of the positioning plate and/or to the plane.

"Provided" is intended to be understood, in particular, as specifically programmed, designed and/or equipped. By an object being provided for a specific function is intended to be understood, in particular, that the object fulfills and/or performs this specific function in at least one use state and/or operational state.

It is further proposed that the supplying induction element has at least one first portion with at least one first principal extension plane and at least one second portion with at least one second principal extension plane which differs from the first principal extension plane. For example, the supplying induction element could have at least one third portion with at least one third principal extension plane which, in particular, could differ from the first principal extension plane and from the second principal extension plane. As a result, in particular, a compact and/or space-saving configuration may be achieved. In particular, a particularly high degree of efficiency and/or uniform electromagnetic radiation may be achieved.

The first principal extension plane and the second principal extension plane could be oriented, for example, at an angle relative to one another. Preferably, the first principal extension plane and the second principal extension plane are oriented at least substantially parallel to one another. "Substantially parallel" is intended to be understood here, in particular, as an orientation of a direction relative to a reference direction, in particular in one plane, wherein the direction relative to the reference direction has a deviation, in particular, of less than 8°, advantageously of less than 5° and particularly advantageously of less than 2°. Advantageously, the first principal extension plane and/or the second principal extension plane are oriented at least substantially parallel to a principal extension plane of the positioning plate and/or to the plane. The first portion and the second portion are arranged spaced apart from one another, in particular, in at least one assembled state in a direction which is oriented parallel to the shortest connection between the supplying induction element and the receiving induction element. As a result, in particular, a particularly high degree of efficiency may be achieved.

It is further proposed that the sub-region is arranged at least for the most part between the first portion and the second portion. The sub-region connects, in particular, the first portion and the second portion together. In particular, the principal extension plane of the sub-region is oriented at an angle relative to the first principal extension plane and/or to the second principal extension plane. Particularly advantageously, an angle between the principal extension plane of the sub-region and the first principal extension plane and/or the second principal extension plane is at least substantially 45°. For example, the supplying induction element in the sub-region could have an at least substantially double-bend-shaped and/or S-shaped cross section. "At least substantially" is intended to be understood, in particular, in this context as a deviation of a maximum of 20°, preferably a maximum of 5° and particularly preferably a maximum of 0.5°. As a result, in particular, a simple and/or uncomplicated and/or rapidly executable production and/or assembly may be possible.

Moreover, it is proposed that the supply unit has at least one further supplying induction element which has at least one further first portion which extends at least substantially inside the first principal extension plane and at least one further second portion which extends at least substantially inside the second principal extension plane. As a result, in particular, an optimal energy transmission may be possible. In particular, it may be achieved that in a first operational state in which the receiving induction element is arranged above the supplying induction element and in a second operational state in which the receiving induction element is arranged above the further supplying induction element, a spacing between the receiving induction element and the corresponding supplying induction element is equal. In particular, at least one of, advantageously at least a large part of, and preferably each of the supplying induction elements has an identical spacing from the receiving induction element, in an operational state in which the receiving induction element is arranged above the corresponding supplying induction element. In particular, due to an identical configuration of the supplying induction elements advantageously a simple and/or uncomplicated control may be possible, whereby in particular low costs may be achieved. In particular, a particularly compact construction and/or a high degree of efficiency may be achieved.

It is additionally proposed that the supplying induction element and the further supplying induction element are arranged so as to overlap one another at least in some sections, when viewed perpendicular to the plane and/or to the first principal extension plane and/or to the second principal extension plane. In particular, the supplying induction element and the further supplying induction element are arranged so as to overlap at least partially in a direction which is oriented parallel to the shortest connection between the supplying induction element and the receiving induction element. The phrase that the supplying induction element and the further supplying induction element are arranged so as to overlap "at least partially" is intended to be understood, in particular, that at least a partial portion of the supplying induction element and at least a partial portion of the further supplying induction element are arranged so as to overlap. For example, merely a partial portion of the supplying induction element and at least a partial portion of the further supplying induction element could be arranged so as to overlap, when viewed perpendicular to the first principal extension plane and/or to the second principal extension plane, wherein in particular a further partial portion of the supplying induction element and a further partial portion of the further supplying induction element may be arranged without overlapping. Alternatively, for example, the supplying induction element and the further supplying induction element could be arranged so as to overlap fully and/or to be congruent, when viewed perpendicular to the first principal extension plane and/or the second principal extension plane. Particularly advantageously, the further first portion of the further supplying induction element and the second portion of the supplying induction element could be arranged so as to overlap at least partially and advantageously at least for the most part. As a result, in particular, a particularly compact and/or space-saving construction and/or a high degree of efficiency may be achieved. For example, an arrangement of the supplying induction element and the further supplying induction element in a row and/or in a matrix may be possible.

It is further proposed that the supplying induction element has an oval, in particular circular and/or elliptical, shape when viewed perpendicular to the plane and/or to the first principal extension plane and/or to the second principal extension plane. As a result, in particular, simple and/or uncomplicated production and/or assembly may be achieved.

For example, the supplying induction element and/or the further supplying induction element could have a polygonal shape, such as for example an at least substantially rectangular and/or square and/or n-angular shape when viewed perpendicular to the plane and/or to the first principal extension plane and/or to the second principal extension plane. Preferably, the supplying induction element and/or the further supplying induction element has a rectangular and/or square shape, when viewed perpendicular to the plane and/or to first principal extension plane and/or to the second principal extension plane. As a result, in particular, a compact arrangement of the supplying induction elements may be possible.

The supply unit could be configured, for example, as an energy charging device, in particular as an induction energy charging device and, in particular, provided to transmit energy by means of the supplying induction element to at least one receiving unit which could be configured in particular as a mobile device, such as for example a laptop and/or a tablet and/or a mobile telephone, and/or a hand-held power tool and/or a self-propelled implement and/or as a remote control and/or a remote operation. Alternatively or additionally, the supply unit could be configured, for example, as a cooking appliance, in particular as an induction cooking appliance, such as for example in particular an oven, in particular an induction oven and/or as a grill, in particular as an induction grill. Preferably, the supply unit is configured as a hob and advantageously as an induction hob.

In particular, by means of the energy provided by the supplying induction element the supply unit heats at least one part of the receiving unit, in particular at least a receiving space of the receiving unit. As a result, in particular, the receiving unit may be supplied with the energy provided for the receiving unit, whereby in particular optimal cooking results and/or a reliable functionality of electrical and/or electronic units integrated in the receiving unit may be achieved.

Moreover, it is proposed that the receiving unit is configured as a positioning unit which is provided, in particular, for positioning on a positioning plate and which has at least one receiving space for receiving food, in particular food to be cooked. A "positioning unit" is intended to be understood, in particular, as a unit which is provided for coupling to the supply unit, in particular to the supplying induction element and which, in particular during the course of coupling to the supply unit receives and/or absorbs energy from the supply unit in at least one operational state. The positioning unit could have, for example, at least one item of cookware. Alternatively or additionally, the positioning unit could have at least one pad apparatus which, in particular, could be provided for positioning at least one item of cookware, in particular the item of cookware. The pad unit could be provided, in particular, for an arrangement between the positioning plate and the item of cookware. Alternatively or additionally, the positioning unit could have at least one housing unit which could be configured, in particular, as an external housing unit and, in particular, could define an external housing. In particular, at least one object of the positioning unit, in particular at least one receiving induction element and/or the transmitting unit, could be integrated at least for the most part in the housing unit. The positioning unit has, in particular, at least one coupling unit which is provided, in particular, for coupling to the supply unit. The coupling unit has, in particular, at least one coupling element which is provided, in particular, for coupling to the supply unit. The coupling element could be configured, in particular, as a coil and/or as an induction element, in particular as a receiving induction element. In particular, the positioning unit could have at least two, advantageously at least three, preferably at least five and particularly preferably a plurality of coupling elements which in each case could be provided, in particular, for coupling to the supply unit and configured, in particular, as receiving induction elements. In particular, in the operational state the receiving induction element could heat a wall at least partially defining the receiving space by means of at least one portion of the energy received by the supplying induction element. A "receiving space" is intended to be understood, in particular, as a spatial region which, in the operational state in which the supply unit in particular transmits energy to the receiving unit, is defined at least for the most part by the receiving unit and in which, in particular, food may be arranged in the operational state. The food could be arranged, in particular, in the receiving space, in particular in fluid form, in particular in liquid form and/or at least for the most part in liquid form and/or in solid form in the receiving space. As a result, in particular, food may be cooked particularly efficiently and/or in a targeted manner since, in particular, an energy required for a cooking process may be accurately transmitted.

A particularly optimized and/or efficient energy transmission may be achieved, in particular, by a method for operating an induction energy transmission system which comprises at least one supply unit that has at least one supplying induction element provided to supply energy, and at least one receiving unit which comprises at least one receiving induction element, wherein energy is received from the supplying induction element when in at least one operational state in which a shortest connection between the supplying induction element and the receiving induction element is minimal, and wherein the supplying induction element comprises at least one sub-region which in the operational state is oriented at an angle relative to a plane that is at least substantially perpendicular to the shortest connection between the supplying induction element and the receiving induction element.

The induction energy transmission system is not intended to be limited in this case to the above-described use and embodiment. In particular, for implementing a mode of operation described herein the induction energy transmission system may have a number of individual elements, components and units which differ from the number thereof cited herein.

Further advantages are disclosed in the following description of the drawings. In the drawings, exemplary embodiments of the invention are shown. The drawings, the description and the claims contain numerous features in combination. The person skilled in the art will also expediently consider the features individually and combine them to form further meaningful combinations.

DETAILED DESCRIPTION OF EXEMPLARY EMBODIMENTS OF THE PRESENT INVENTION

Figure 1A:
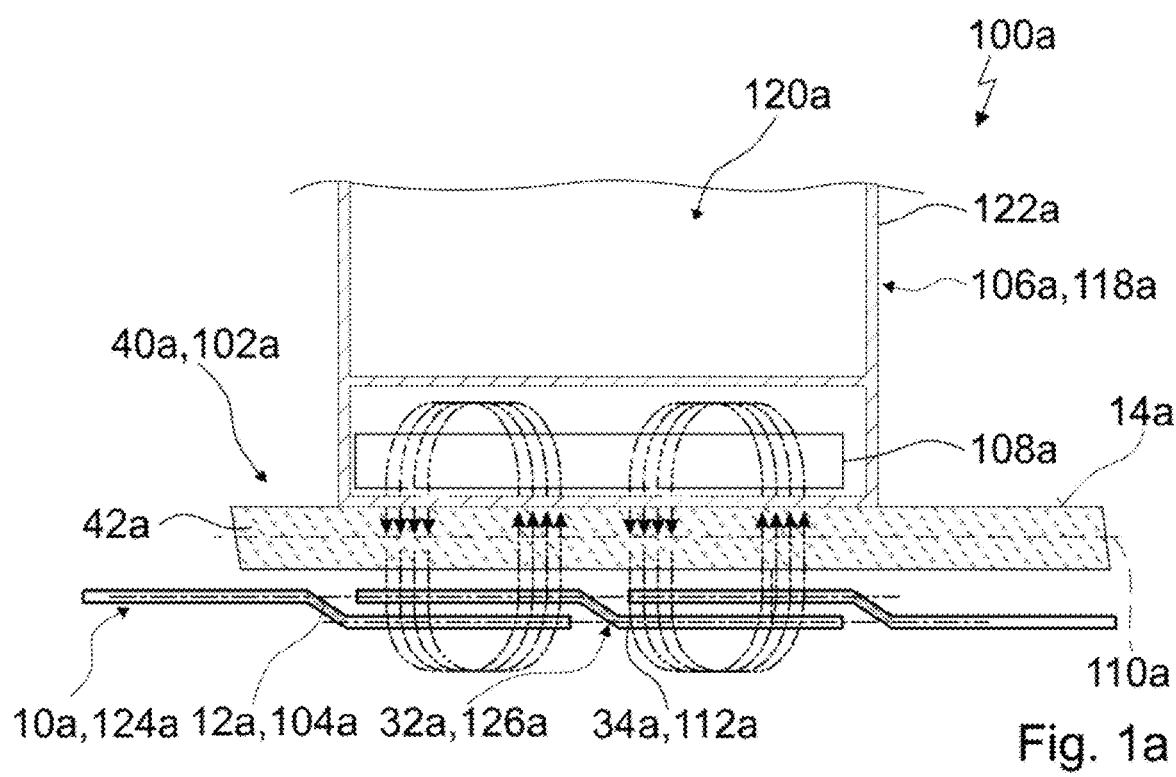
FIG. 1a shows an induction energy transmission system with a supply unit and with a receiving unit in a schematic partial sectional view.

FIG. 1a shows an induction energy transmission system 100a which is configured as an induction cooking system. In the present exemplary embodiment, the induction energy transmission system 100a is configured as an induction hob system.

The induction energy transmission system 100a has a supply unit 102a. The supply unit 102a is configured as a hob. In the present exemplary embodiment the supply unit 102a is configured as an induction hob 40a. The supply unit 102a has a supplying induction element 104a.

The supplying induction element 104a is provided to supply energy. In an operational state, the supplying induction element 104a inductively provides energy. In the present exemplary embodiment, the supplying induction element 104a is configured as an induction heating element 12a.

The induction energy transmission system 100a has a supplying induction unit 124a. The supplying induction element 104a is part of the supplying induction unit 124a.

The induction energy transmission system 100a has a receiving unit 106a. Alternatively, the induction energy transmission system 100a could have a larger number of receiving units 106a, such as for example at least two, in particular at least three, advantageously at least four, particularly advantageously at least five, preferably at least six and particularly preferably a plurality of receiving units 106a. Only one of the receiving units 106a is described hereinafter.

In the present exemplary embodiment, the receiving unit 106a has a receiving induction element 108a. In the operational state the receiving induction element 108a inductively receives energy from the supplying induction element 104a. The receiving induction element 108a is configured as a coil and namely, in particular, as a secondary coil. In the operational state, a shortest connection between the supplying induction element 104a and the receiving induction element 108a is minimal. In the operational state the receiving induction element 108a and the supplying induction element 104a, when viewed in a direction oriented parallel to the shortest connection, are arranged so as to overlap.

In the present exemplary embodiment, the receiving unit 106a is configured as a positioning unit 118a. Alternatively the receiving unit 106a could be configured, for example, as a mobile device, in particular as mobile telephone and/or as a laptop and, in particular, for receiving energy from the supplying induction element 104a, in particular for the purpose of inductive charging.

The receiving unit 106a has a receiving space 120a for receiving food. In the present exemplary embodiment, the receiving unit 106a has a housing unit 122a. The housing unit 122a is configured as an external housing unit and in the operational state forms, in particular, an external housing of the receiving unit 106a. The receiving induction element 108a is integrated for the most part inside the housing unit 122a.

The supplying induction element 104a, which is provided, in particular, for inductively supplying the receiving induction element 108a with energy, has a sub-region 16a which in the operational state is oriented at an angle relative to a plane 110a, which is oriented substantially perpendicular to the shortest connection between the supplying induction element 104a and the receiving induction element 108a (see also FIG. 3). In the operational state a principal extension plane 18a of the sub-region 16a is oriented at an angle relative to a plane 110a. In the present exemplary embodiment, the plane 110a is oriented substantially parallel to a hob plane 14a.

In addition to the sub-region 16a, the supplying induction element 104a has a first portion 20a with a first principal extension plane 24a and a second portion 22a with a second principal extension plane 26a. The second principal extension plane 26a is different from the first principal extension plane 24a.

The first principal extension plane 24a is oriented at an angle relative to the sub-region 16a, in particular to the principal extension plane 18a of the sub-region 16a. The second principal extension plane 26a is oriented at an angle relative to the sub-region 16a, in particular to the principal extension plane 18a of the sub-region 16a. The first principal extension plane 24a and the second principal extension plane 26a are oriented substantially parallel to one another. The first principal extension plane 24a and the second principal extension plane 26a are oriented substantially parallel to the plane 110a.

The sub-region 16a is arranged for the most part between the first portion 20a and the second portion 22a. The sub-region 16a connects the first portion 20a and the second portion 22a, in particular mechanically and/or electrically together.

In addition to the supplying induction element 104a, the supply unit 102a has a plurality of further supplying induction elements 112a. In each case only one of the repeatedly present objects is provided with a reference numeral in the figures. In FIG. 1a only two of the further supplying induction elements 112a are shown. The further supplying induction elements 112a are configured corresponding to one another. Hereinafter, only one of the further supplying induction elements 112a is described.

The further supplying induction element 112a has a further first portion 50a which extends substantially inside the first principal extension plane 24a and a further second portion 52a which extends substantially inside the second principal extension plane 26a (see FIG. 3). The further supplying induction element 112a has a further sub-region 38a which in the operational state is oriented at an angle relative to the plane 110a. The further sub-region 38a is arranged for the most part between the further first portion 50a and the further second portion 52a.

The induction energy transmission system 100a has a further supplying induction unit 126a. The further supplying induction element 112a is part of the further supplying induction unit 126a.

When viewed perpendicular to the plane 110a, the supplying induction element 104a and the further supplying induction element 112a are arranged so as to overlap partially. The further first portion 50a and the second portion 22a are arranged so as to overlap, when viewed perpendicular to the plane 110a.

In the present exemplary embodiment, the supplying induction element 104a has an oval shape, when viewed perpendicular to the plane 110a. The supplying induction element 104a has a circular shape, when viewed perpendicular to the plane 110a.

A detailed exemplary embodiment selected by way of example is described hereinafter with reference to the induction hob 40a. Features which are described relative to the induction hob 40a are transferable to the supply unit 102a. Similarly, features which are described relative to the induction heating element 12a are transferable to the supplying induction element 104a.

In a method for an operation of an induction energy transmission system 100a, in the operational state energy is inductively provided by the supplying induction element 104a and/or by the further supplying induction element 112a. In at least one operational state in which a shortest connection between the supplying induction element 104a and the receiving induction element 108a is minimal, energy from the supplying induction element 104a is received by the receiving induction element 108a.

In particular in the exemplary embodiments of FIGS. 1b to 7c, only the induction hob 40a, the induction heating unit 10a and the induction heating element 12a are described hereinafter. The following description of the induction hob 40a is transferable to the supply unit 102a. The following description of the induction heating unit 10a is transferable to the supplying induction unit 124a. The following description of the induction heating element 12a is transferable to the supplying induction element 104a. The same applies to the further supplying induction unit 126a and the further supplying induction element 112a.

Figure 1B:
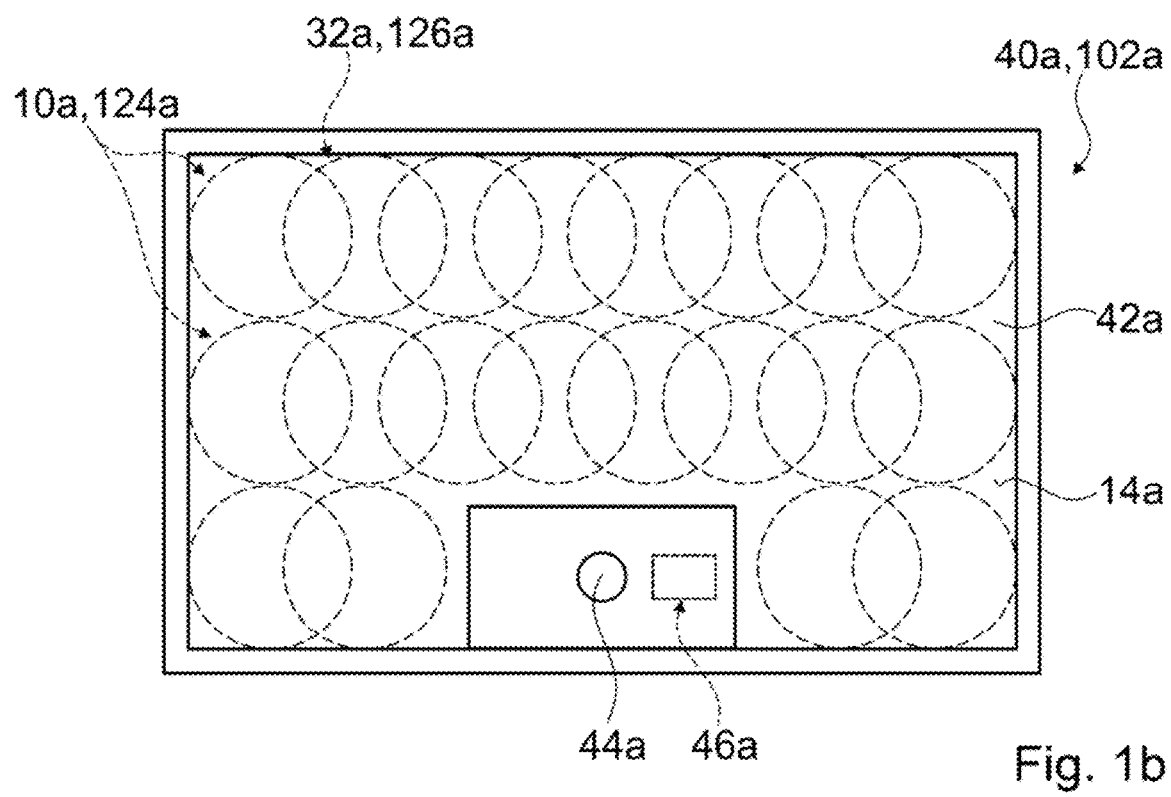
FIG. 1b shows the supply unit configured as an induction hob with an induction hob apparatus in a schematic plan view.

FIG. 1b shows an induction hob 40a with an induction hob apparatus. The induction hob apparatus has a positioning plate 42a. The positioning plate 42a is configured as a hob plate. In an assembled state the positioning plate 42*a* forms a part of a hob external housing, in particular of the induction hob 40*a*. In an installed position the positioning plate 42*a* forms a part of the hob external housing facing a user. In an assembled state the positioning plate 42*a* is provided for positioning at least one receiving unit 106*a*.

The induction hob apparatus has a user interface 44*a* for the input and/or selection of operating parameters, for example a heating power and/or a heating power density and/or a heating zone. The user interface 44*a* is provided for the output of a value of an operating parameter to a user. For example, the user interface 44*a* could output the value of the operating parameter to a user optically and/or acoustically.

The induction hob apparatus has a control unit 46*a*. The control unit 46*a* is provided to perform actions as a function of operating parameters input by means of the user interface 44*a* and/or to change settings.

The induction hob apparatus has a plurality of overlapping induction heating units 10*a*, 32*a*. In the present exemplary embodiment, the induction heating units 10*a*, 32*a*, 48*a* are arranged in the form of a matrix. A matrix hob comprises the induction hob apparatus. In the present exemplary embodiment, the induction heating units 10*a*, 32*a*, 48*a* have a substantially circular shape, when viewed perpendicular to a hob plane 14*a* of the induction hob apparatus.

For example in addition to the overlapping induction heating units 10*a*, 32*a*, 48*a*, the induction hob apparatus could have at least one further induction heating unit (not shown) which could be arranged, in particular, without overlap relative to the overlapping induction heating units 10*a*, 32*a*, 48*a*.

The induction heating units 10*a* are provided to heat at least one receiving unit 106*a* positioned on the positioning plate 42*a* above the induction heating units 10*a*. In an operational state the induction heating units 10*a*, which in particular are activated, provide a magnetic flux which is provided, in particular, for heating at least one positioned receiving unit 106*a*. In an operational state, the induction heating units 10*a*, which in particular are activated, supply energy at least to a positioned receiving unit 106*a*, in particular by means of the magnetic flux. In an operational state, the control unit 46*a* controls an energy supply to the, in particular, activated induction heating units 10*a*, 32*a*, 48*a*. In an installed position, the induction heating units 10*a* are arranged below the positioning plate 42*a*.

Figure 2A:
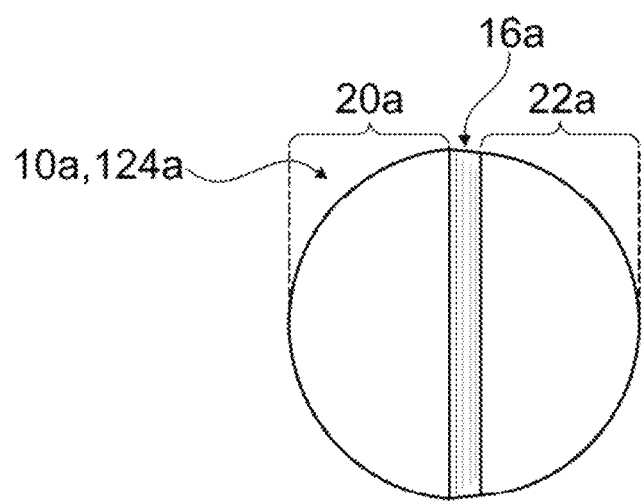
FIG. 2a shows an induction heating unit of the induction hob apparatus in a schematic plan view.
Figure 2B:
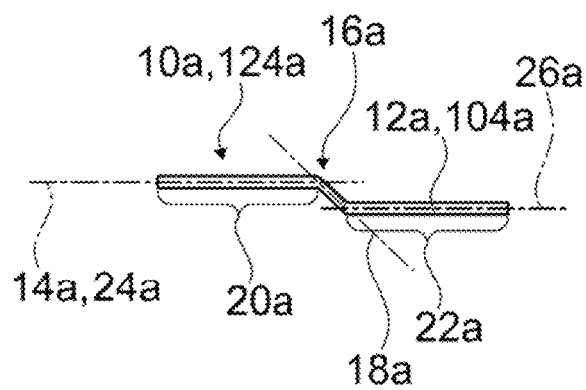
FIG. 2b shows the induction heating unit according to FIG. 2a in a schematic side view.

One of the induction heating units 10*a*, 32*a*, 48*a* is shown by way of example in FIGS. 2*a* and 2*b*. In this case, the following description of the one induction heating unit is transferable to all of the other induction heating units. The induction hob apparatus comprises an induction heating element 12*a*. The induction heating element 12*a* forms a heating conductor. The induction heating element 12*a* is configured integrally. The induction heating element 12*a* is shown in a plate-shaped manner for a simpler view. In reality, the induction heating element 12*a* is a wire which has been wound in a spiral-shaped manner. The induction heating element 12*a* extends in a sub-region 16*a* along a principal extension plane 18*a* of the sub-region 16*a*. The principal extension plane 18*a* of the sub-region 16*a* deviates from the hob plane 14*a*. The principal extension plane 18*a* of the sub-region 16*a* encloses with the hob plane 14*a* an angle of approximately 45°.

Figure 3A:
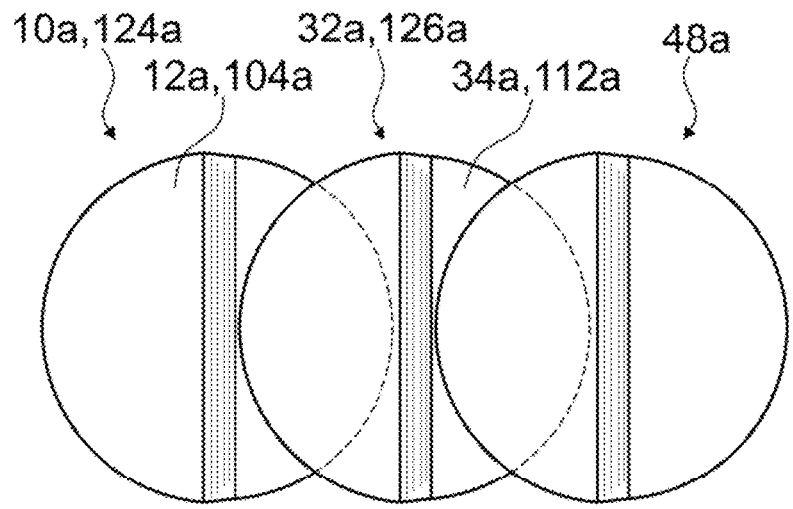
FIG. 3a shows three induction heating units of the induction hob apparatus in a schematic plan view.
Figure 3B:
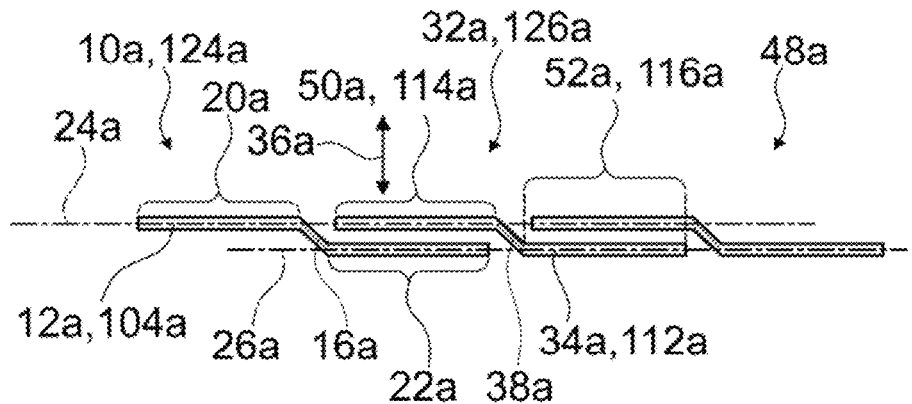
FIG. 3b shows the three induction heating units according to FIG. 3a in a schematic side view.

The induction heating element 12*a* has a first portion 20*a*. The induction heating element 12*a* has a second portion 22*a*. The first portion 20*a* extends inside a first principal extension plane 24*a*. The second portion 22*a* extends inside a second principal extension plane 26*a*. The second principal extension plane 26*a* is different from the first principal extension plane 24*a*. The first principal extension plane 24*a* and the second principal extension plane 26*a* run parallel to one another. The first principal extension plane 24*a* and the second principal extension plane 26*a* are offset parallel to one another. The first principal extension plane 24*a* extends parallel to the hob plane 14*a*. The sub-region 16*a* is arranged between the first portion 20*a* and the second portion 22*a*. The principal extension plane 18*a* of the sub-region 16*a* runs obliquely to the first principal extension plane 24*a*. The principal extension plane 18*a* of the sub-region 16*a* runs obliquely to the second principal extension plane 26*a*. The first portion 20*a* and the second portion 22*a* are of equal size. The first portion 20*a* and the second portion 22*a* have an equal surface area, width and/or length. The induction heating unit 10*a* and a further induction heating unit 32*a* of the induction hob apparatus are shown in FIGS. 3*a* and 3*b*. A third induction heating unit 48*a* is also shown, but is not described in more detail since it has the same construction as the induction heating units 10*a*, 32*a*.

The further induction heating unit 32*a* comprises a further induction heating element 34*a*. The further induction heating element 34*a* has a further first portion 50*a* and a further second portion 52*a*. The further first portion 50*a* extends in an operational state and/or in an assembled state inside the first principal extension plane 24*a*. The further second portion 52*a* extends inside the second principal extension plane 26*a*. The induction heating element 12*a* and the further induction heating element 34*a* partially overlap one another in a direction 36*a* viewed perpendicular to the first principal extension plane 24*a*. In particular, the further first portion 50*a* of the further induction heating element 34*a* overlaps at least for the most part the second portion 22*a* of the induction heating element 12*a*.

In a variant of the invention, the induction heating element 12*a'* of the induction heating unit 10*a'* has a third portion 54*a'* in addition to the first portion 20*a'* and second portion 22*a'*. The third portion 54*a'* extends at least substantially inside a third principal extension plane. The third principal extension plane is different from the first and second principal extension planes 24*a'*, 26*a'*. The first principal extension plane 24*a'*, the second principal extension plane 26*a'* and the third principal extension plane run parallel to one another. The first principal extension plane 24*a'*, the second principal extension plane 26*a'* and the third principal extension plane are arranged offset in parallel to one another. The second principal extension plane 26*a'*, viewed in a direction 36*a'* perpendicular to the first principal extension plane 24*a'*, is arranged between the first principal extension plane 24*a'* and the third principal extension plane. The induction heating element 12*a'* has two sub-regions 16*a'* which run along a principal extension plane 18*a'* of one of the sub-regions 16*a'* and a principal extension plane of a further sub-region 16*a'* which both deviate from the hob plane 14*a'*. The principal extension plane 18*a'* of the sub-region 16*a'* and the principal extension plane of the further sub-region 16*a'* run parallel to one another. The portions 20*a'*, 22*a'*, 54*a'* divide the induction heating element 12*a'* in at least one direction into three parts of equal length. As is shown, a plurality of induction heating elements 12*a'* overlap one another such that the first portion 20*a'* and the second portion 22*a'* of an induction heating element 12*a'* overlaps a further second portion 52*a'* and a further third portion 62*a'* of a further induction heating element 34*a'* of an induction heating unit 32*a'*.

Figure 3C:
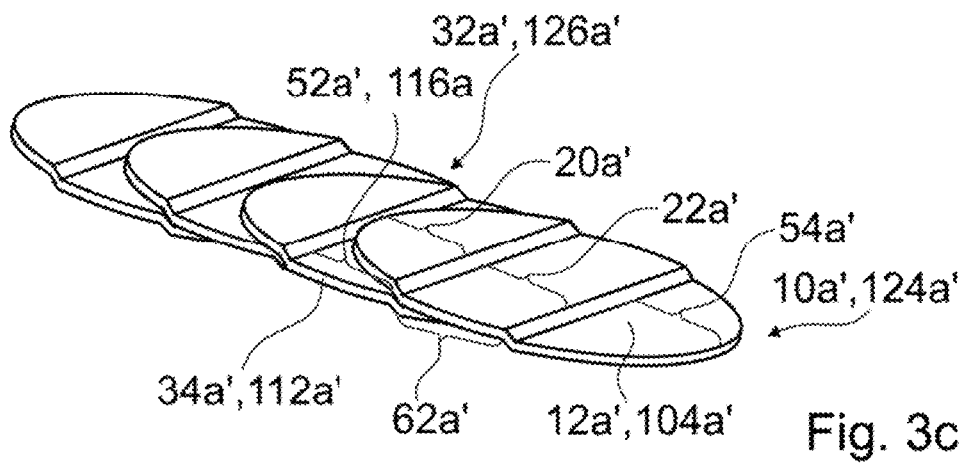
FIG. 3c shows three induction heating units of an alternatively configured induction hob apparatus in a schematic perspective view.
Figure 3D:
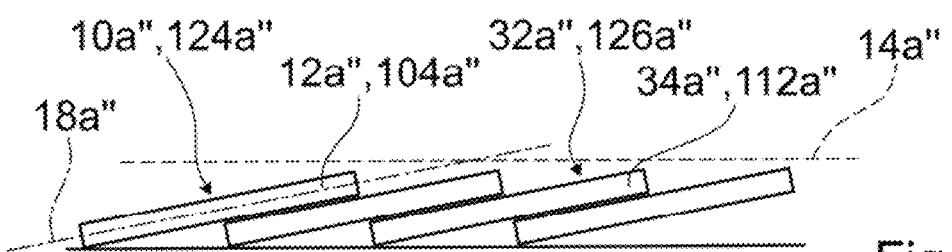
FIG. 3d shows three induction heating units of an alternatively configured induction hob apparatus in a schematic side view.

In contrast to the variant shown in FIG. 2*d*, in which it is shown that the induction heating element 12*a* does not extend only along a principal extension plane 18*a* which deviates from the hob plane 14*a*, the induction heating element 12*a*" as shown in FIG. 3*d*, extends entirely along a principal extension plane 18*a*" which deviates from the hob plane 14*a*". In this case a plurality of induction heating elements 12*a*" may also partially overlap. In this case the induction heating elements 12*a*" are layered obliquely relative to one another.

Figure 4A:
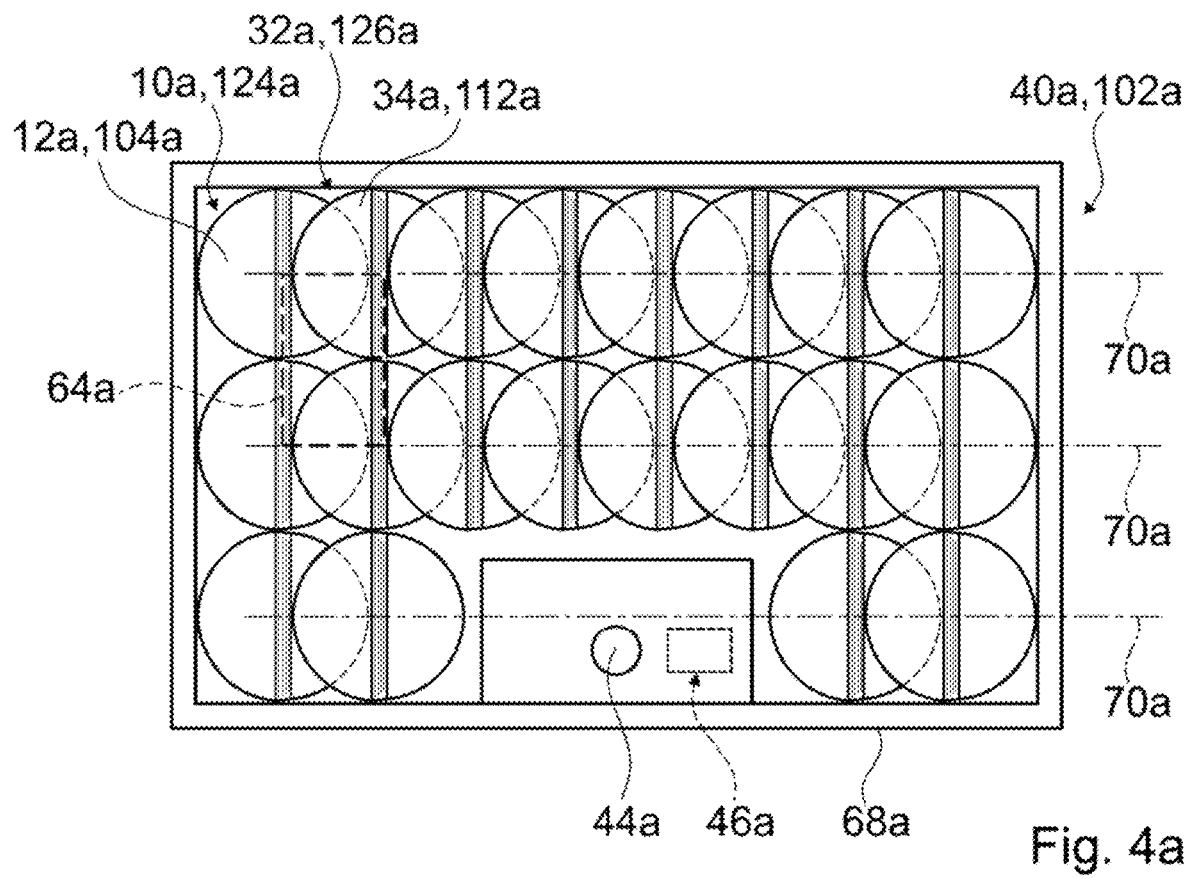
FIG. 4a shows the induction hob apparatus in a schematic plan view.

FIGS. 4*a* to 4*e* show all of the positioning plates 42*a* with different arrangement options of the induction heating units 10*a*, 32*a*. In FIG. 4*a* the central points of all of the induction heating units 10*a*, 32*a* are arranged in a matrix. The induction heating units 10*a*, 32*a* are arranged in respective rows 70*a* one behind the other and overlapping one another. There are no overlaps between two adjacent rows 70*a*. The rows 70*a* run parallel to a longest outer edge 68*a* of the positioning plate 42*a*. The rows 70*a* run parallel to one another. If four central points of induction heating units 10*a*, 32*a* located closest to one another are connected together, this produces a rectangle 64*a*, the length and width thereof deviating from one another. A longest edge of the rectangle 64*a* runs perpendicular to the outer edge 68*a*.

Figure 4B:
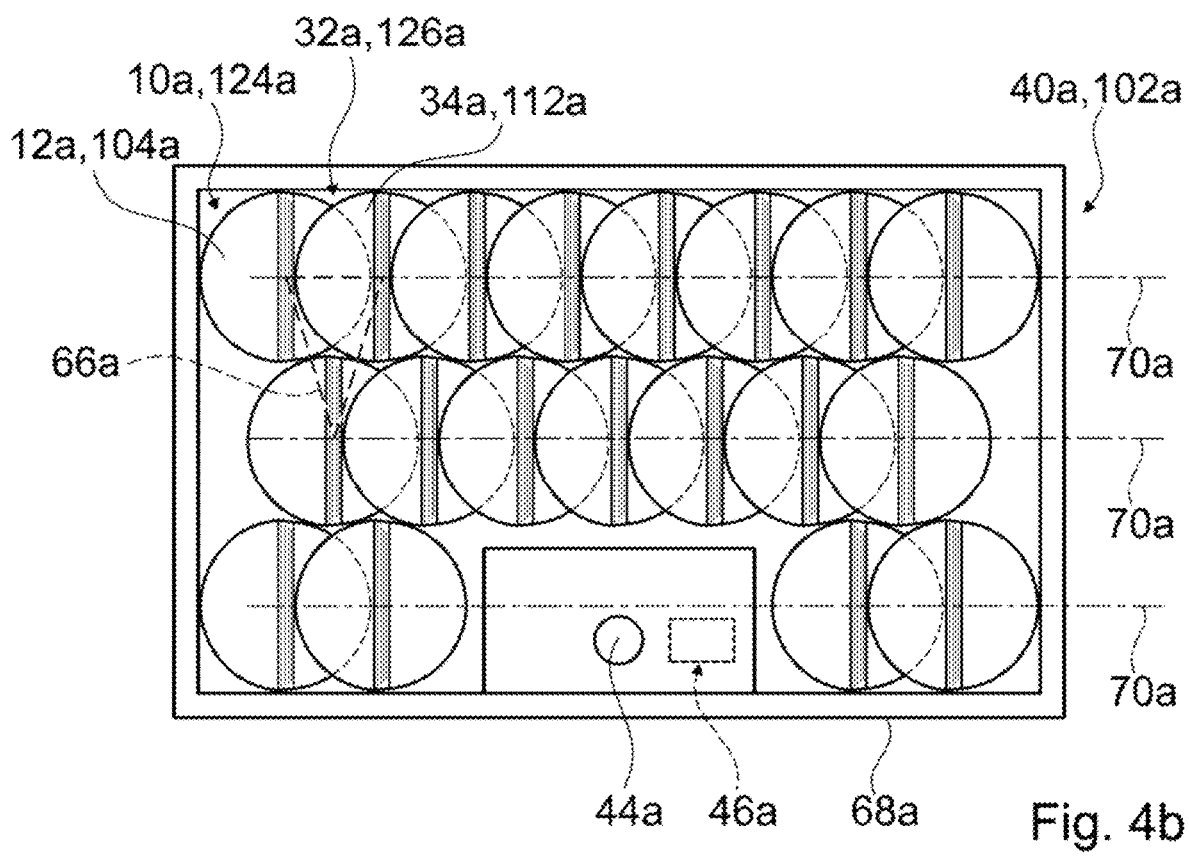
FIG. 4b shows an alternatively configured induction hob apparatus in a schematic plan view.

In FIG. 4*b* the central points of all of the induction heating units 10*a*, 32*a* are arranged offset to one another in rows 70*a*. Thus the induction heating units 10*a*, 32*a* are arranged in rows 70*a* one behind the other and overlapping one another. There are no overlaps between two adjacent rows 70*a*. The rows 70*a* run parallel to a longest outer edge 68*a* of the positioning plate 42*a*. The rows 70*a* run parallel to one another. If three central points of induction heating units 10*a*, 32*a* located closest to one another are connected together, this produces an isosceles triangle 66*a*. A base of the isosceles triangle 66*a* runs parallel to the rows 70*a* and/or to the outer edge 68*a*.

Figure 4C:
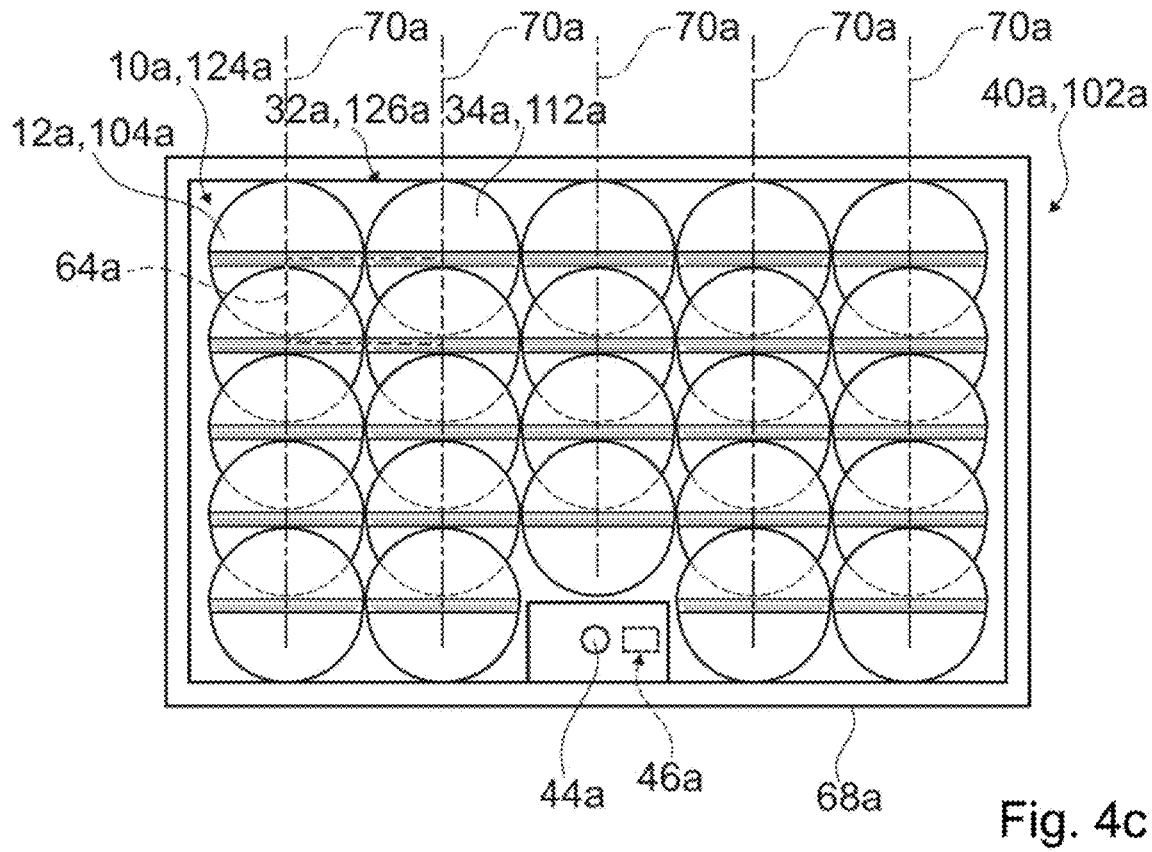
FIG. 4c shows an alternatively configured induction hob apparatus in a schematic plan view.

In FIG. 4*c* the central points of all of the induction heating units 10*a*, 32*a* are arranged in a matrix. The induction heating units 10*a*, 32*a* are arranged in respective rows 70*a* one behind the other and overlapping one another. There are no overlaps between two adjacent rows 70*a*. The rows 70*a* run perpendicular to a longest outer edge 68*a* of the positioning plate 42*a*. The rows 70*a* run parallel to one another. If four central points of induction heating units 10*a*, 32*a* located closest to one another are connected together, this produces a rectangle 64*a*, the length and width thereof deviating from one another. A longest edge of the rectangle 64*a* runs parallel to the outer edge 68*a*.

Figure 4D:
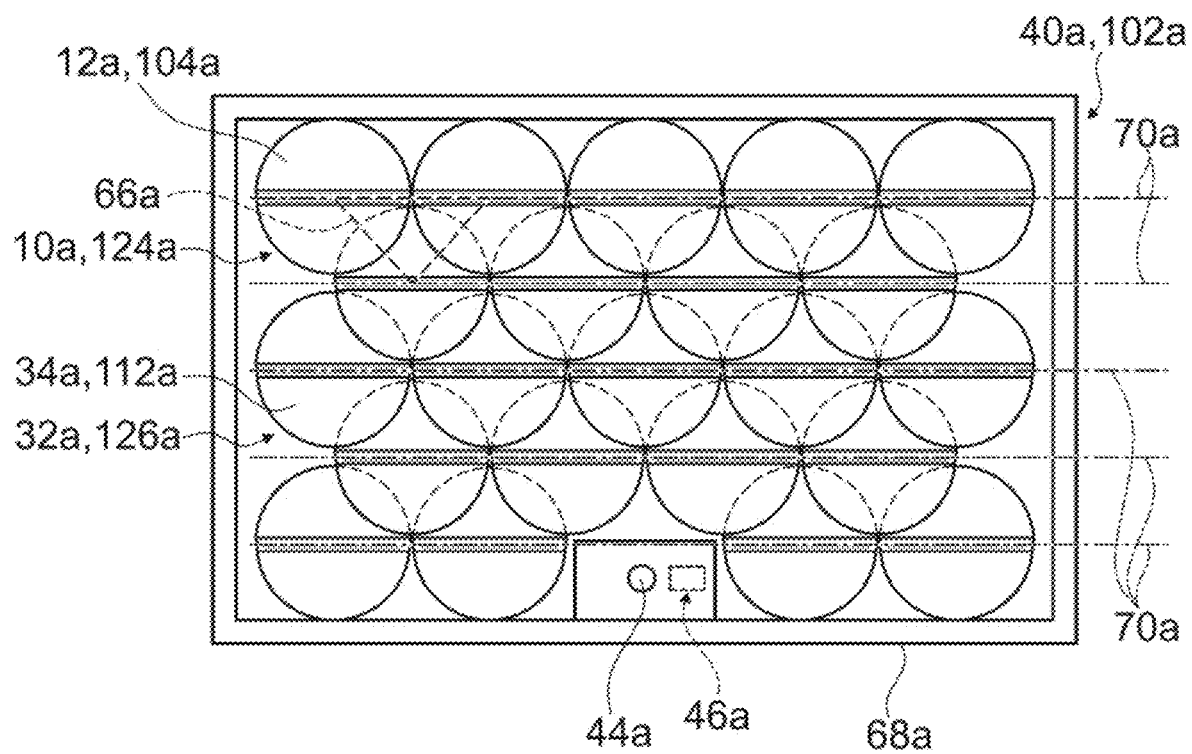
FIG. 4d shows an alternatively configured induction hob apparatus in a schematic plan view.

In FIG. 4*d* the central points of all of the induction heating units 10*a*, 32*a* are arranged offset to one another in rows 70*a*. The induction heating units 10*a*, 32*a* are arranged in rows 70*a* and columns 72*a* one behind the other and overlapping one another. In this case overlaps are also produced between two adjacent rows 70*a*. The rows 70*a* run parallel to a longest outer edge 68*a* of the positioning plate 42*a*. The rows 70*a* run parallel to one another. If three central points of induction heating units 10*a*, 32*a* located closest to one another are connected together, this produces an isosceles and at least substantially right-angled triangle 66*a*. A base of the isosceles triangle 66*a* runs parallel to the rows 70*a* and/or to the outer edge 68*a*.

Figure 4E:
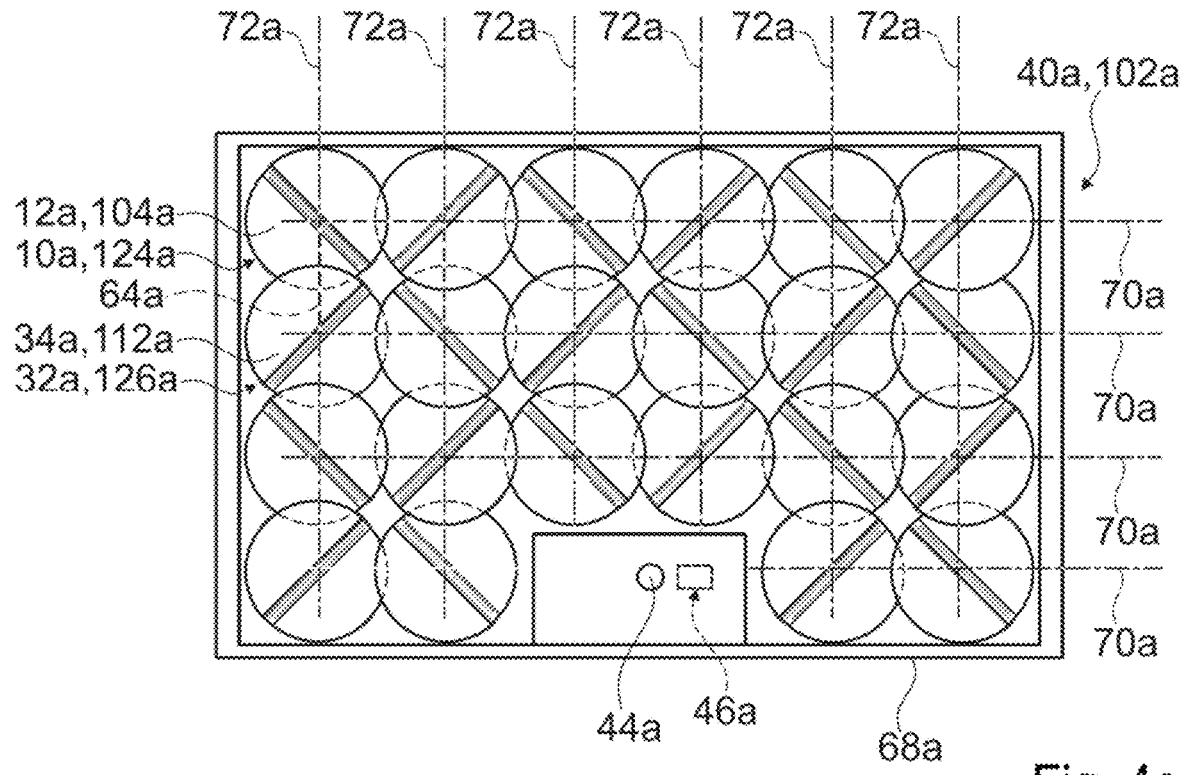
FIG. 4e shows an alternatively configured induction hob apparatus in a schematic plan view.

In FIG. 4*e* the central points of all of the induction heating units 10*a*, 32*a* are arranged in a matrix. The induction heating units 10*a*, 32*a* are arranged in respective rows 70*a* and columns 72*a* one behind the other and overlapping one another. The rows 70*a* and columns 72*a* form a square pattern. In this case there are overlaps of the induction heating units 10*a*, 32*a* between two adjacent rows 70*a* and columns 72*a*. The rows 70*a* run parallel to a longest outer edge 68*a* of the positioning plate 42*a*. The columns 72*a* run perpendicular to a longest outer edge 68*a* of the positioning plate 42*a*. The rows 70*a* run parallel to one another. The columns 72*a* run parallel to one another. If four central points of induction heating units 10*a*, 32*a* located closest to one another are connected together, this produces a square 64*a*.

Figure 4F:
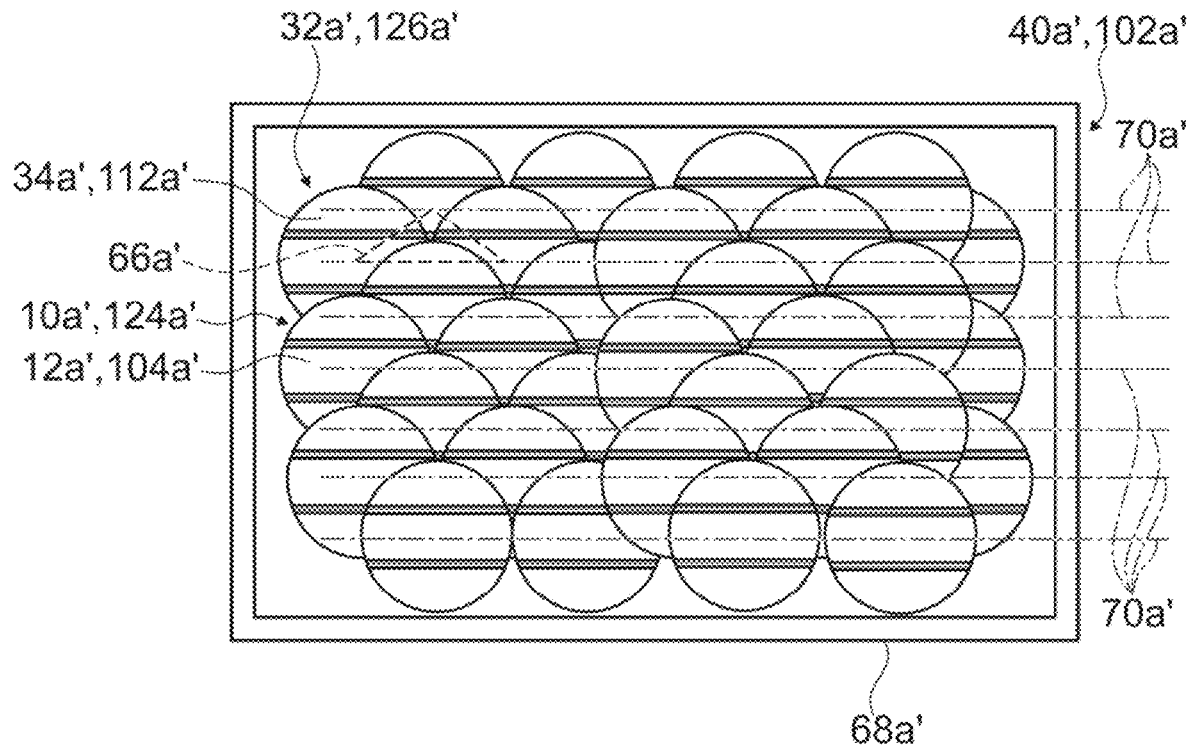
FIG. 4f shows an alternatively configured induction hob apparatus in a schematic plan view.

FIG. 4*f* shows an alternatively configured positioning plate 42*a*' with an arrangement option of the induction heating units 10*a*', 32*a*' shown in FIG. 3*c*. The induction heating units 10*a*', 32*a*' are arranged in rows 70*a*' and columns 72*a*' one behind the other and overlapping one another. In this case overlaps are also produced between two adjacent rows 70*a*'. The rows 70*a*' run parallel to a longest outer edge 68*a*' of the positioning plate 42*a*'. The rows 70*a*' run parallel to one another. If three central points of induction heating units 10*a*', 32*a*' located closest to one another are connected together, this produces an isosceles and at least substantially right-angled triangle 66*a*'. A base of the isosceles triangle 66*a*' runs parallel to the rows 70*a*' and/or to the outer edge 68*a*'.

Figure 5A:
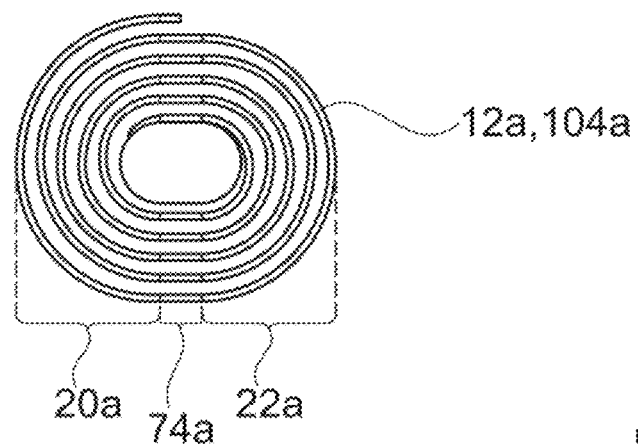
FIG. 5a shows an induction heating element of an induction heating unit in a schematic plan view.

In FIG. 5*a* the induction heating element 12*a* of the induction heating unit 10*a* is shown in detail. The induction heating element 12*a* is wound and/or bent in a spiral-shaped and/or coil-shaped manner. In a bending region 74*a* the induction heating element 12*a* runs in a linear manner. Various windings of the induction heating element 12*a* run parallel to one another in the bending region 74*a*. In a method described hereinafter the bending region 74*a* is reshaped into the already described sub-region 16*a*.

Figure 5B:
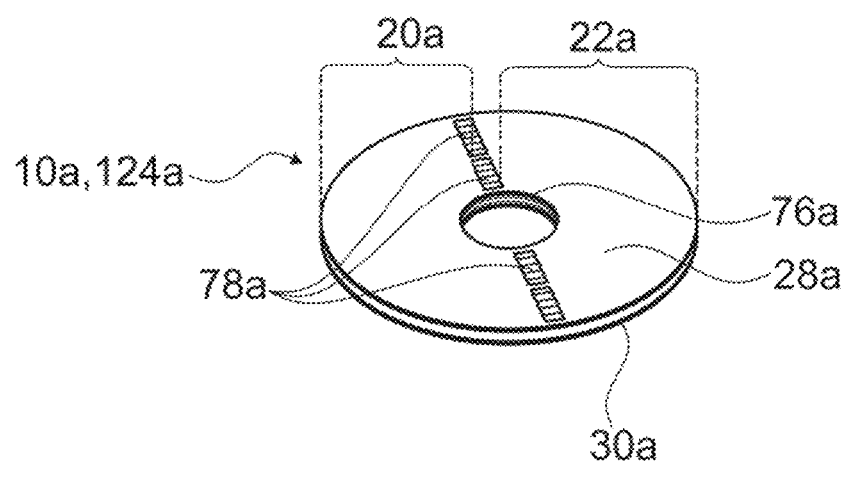
FIG. 5b shows a heating element support of an induction heating unit before a bending process in a schematic perspective view.
Figure 5C:
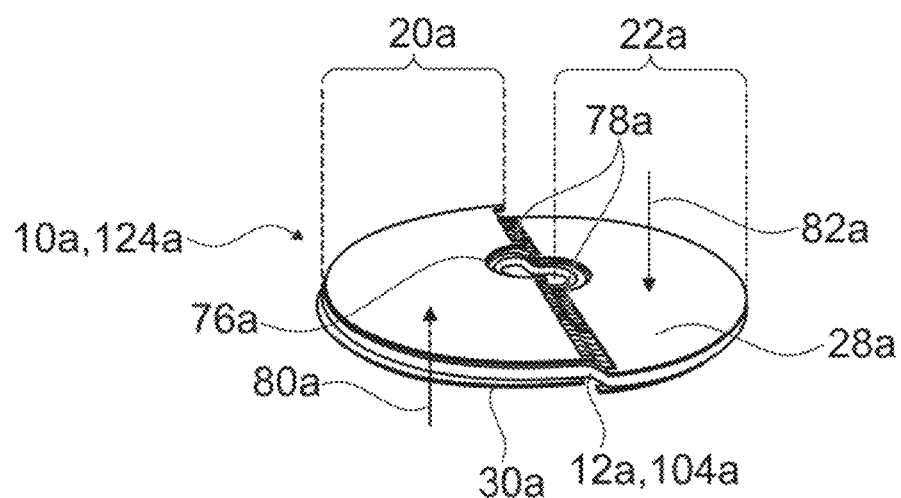
FIG. 5c shows the heating element support and the induction heating element after a bending process in a schematic perspective view.
Figure 5D:
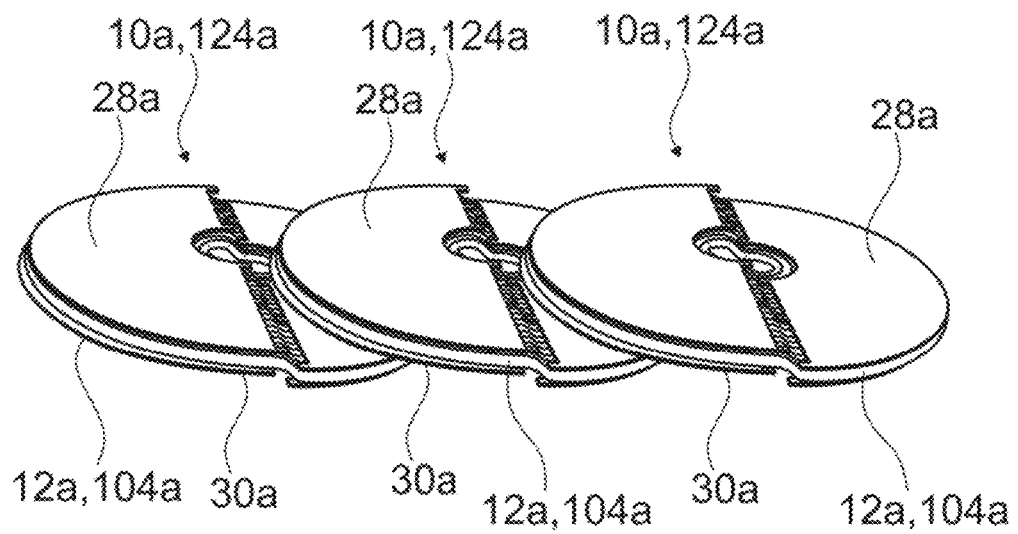
FIG. 5d shows an arrangement of a plurality of induction heating units in a schematic perspective view.

As shown in FIG. 5*b* the induction heating unit 10*a* comprises a first heating element support 28*a*. The heating element support 28*a* forms a disk. The heating element support 28*a* is configured from a material, such as in particular from plastic and/or a mica material, which appears expedient to the person skilled in the art. In a central point the heating element support 28*a* has a recess 76*a*. The recess 76*a* is configured to be continuous. The recess 76*a* is configured to be circular. The recess 76*a* is punched out of the heating element support 28*a*. Along the bending region 74*a* the heating element support 28*a* has further recesses 78*a*. The further recesses 78*a* are punched out of the heating element support 28*a*. The further recesses 78*a* form a predetermined rupture point of the heating element support 28*a*. Moreover, the induction heating unit 10*a* comprises a second heating element support 30*a*. The second heating element support 30*a* is configured to be structurally the same as the first heating element support 28*a*. The heating element supports 28*a*, 30*a* are arranged congruently one above the other. The induction heating element 12*a* is arranged between the heating element supports 28*a*, 30*a*. The induction heating element 12*a* is arranged at least in some sections on the first heating element support 28*a*. The induction heating element 12*a* is arranged at least in some sections on the second heating element support 30*a*. The heating element support 28*a*, 30*a* and the induction heating element 12*a* form a sandwich structure.

In a method for producing the induction hob apparatus, in a method step the first portion 20*a* of the induction heating element 12*a* of the induction heating unit 10*a* is supplied with at least one first force component 80*a* perpendicular to a principal extension plane of the induction heating unit 10*a*. The force component 80*a* in this case acts on one of the heating element supports 28*a*, 30*a*. In this case the force component 80*a* is exerted on the second heating element support 30*a*. A force component 82*a* opposing the force component 80*a* acts in the second portion 22*a* on the induction heating element 12a of the induction heating unit 10a via the first heating element support 28a. At least by means of the first force component 80a the principal extension plane 24a of the first portion 20a is displaced relative to a principal extension plane 26a of the second portion 22a of the induction heating unit 10a. In this case the heating element supports 28a, 30a rupture along their predetermined rupture points. The induction heating element 12a is bent and/or permanently plastically deformed in some sections. More specifically, the induction heating unit 10a is folded and/or bent twice. The induction heating element 12a in this case is bent in a double-bend-shaped and/or S-shaped manner. The heating element supports 28a, 30a form an insulating layer. This insulating layer is separated in an intermediate portion arranged between the first portion 20a and the second portion 22a, in particular separated in a controlled manner. Subsequently, the induction heating units 10a thus produced are arranged so as to overlap one another as shown by way of example in FIG. 5d.

Figure 6A:
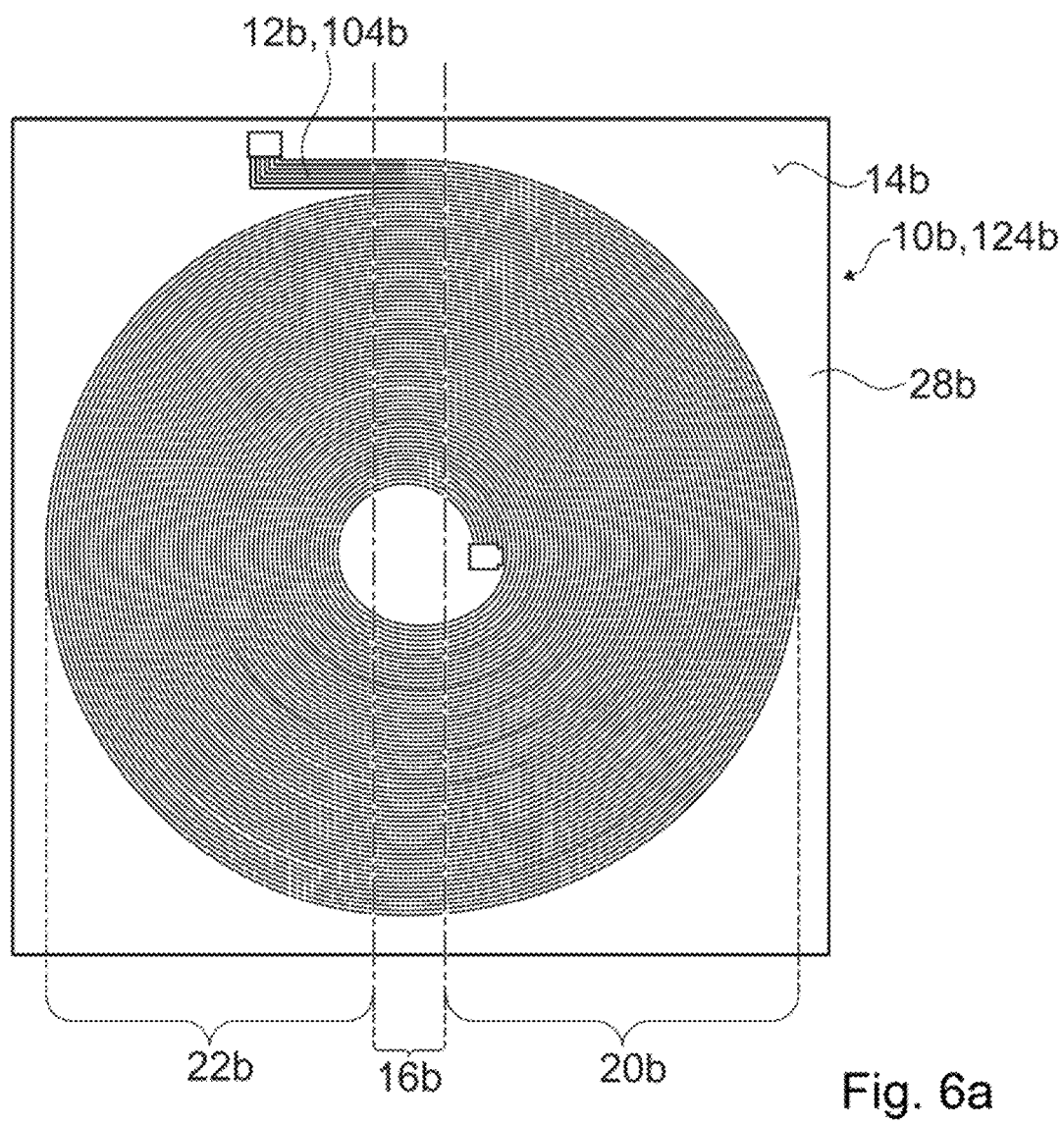
FIG. 6a shows an induction heating unit of a second exemplary embodiment of an induction hob apparatus in a schematic plan view.
Figure 6B:
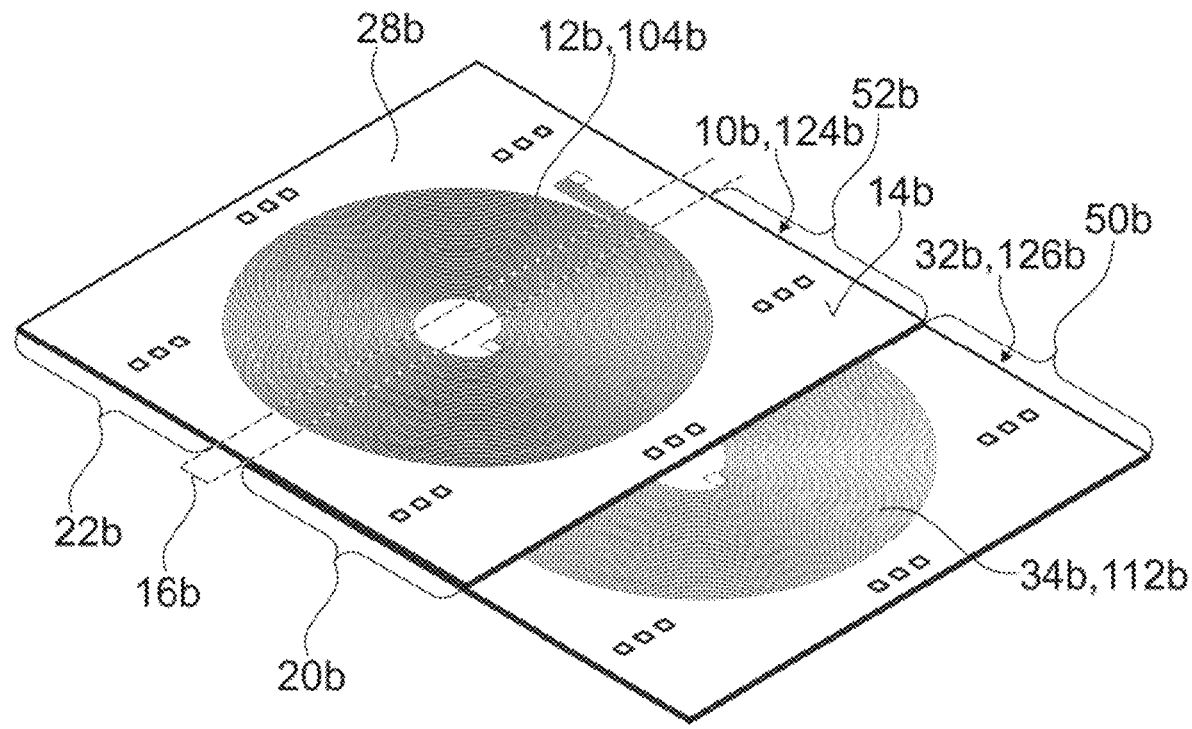
FIG. 6b shows two induction heating units of the second exemplary embodiment of the induction hob apparatus in a schematic perspective view.
Figure 6C:
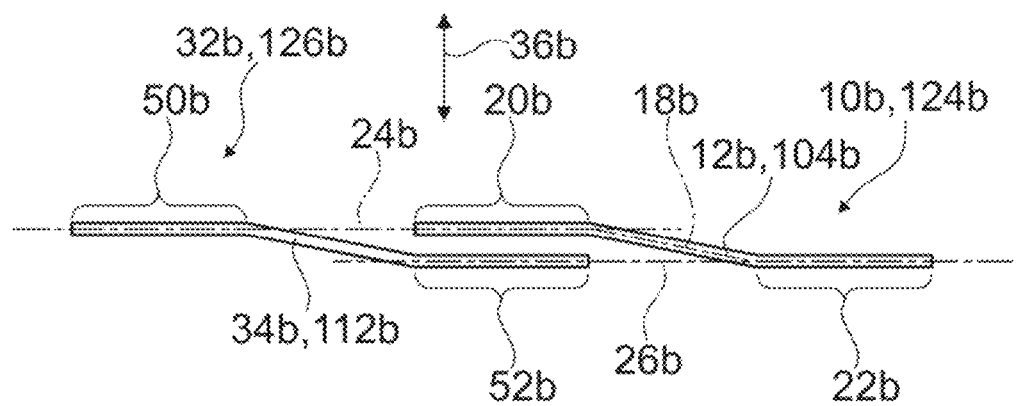
FIG. 6c shows the two induction heating units according to FIG. 6b in a schematic side view.
Figures 7A, 7B:
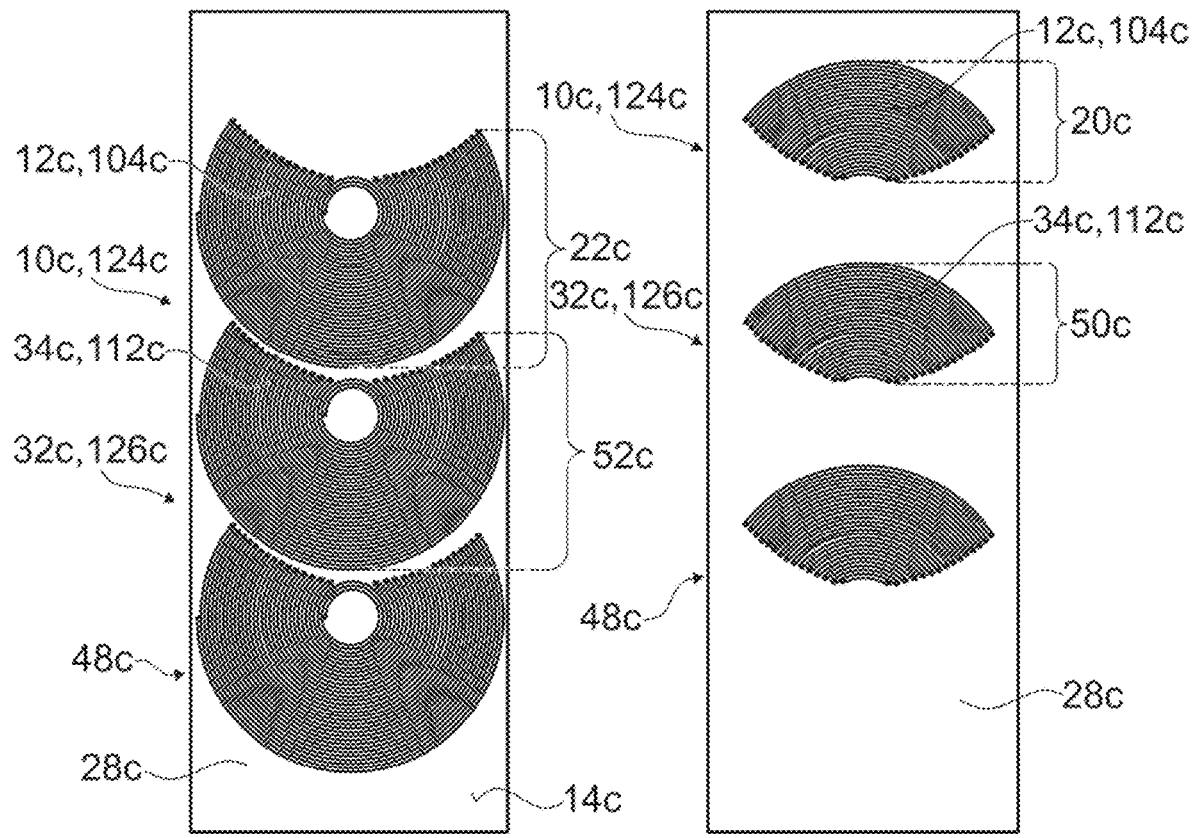
FIG. 7a shows three induction heating units of a third exemplary embodiment of the induction hob apparatus in a schematic plan view.
FIG. 7b shows the three induction heating units according to FIG. 7a in a schematic view from below.
Figure 7C:
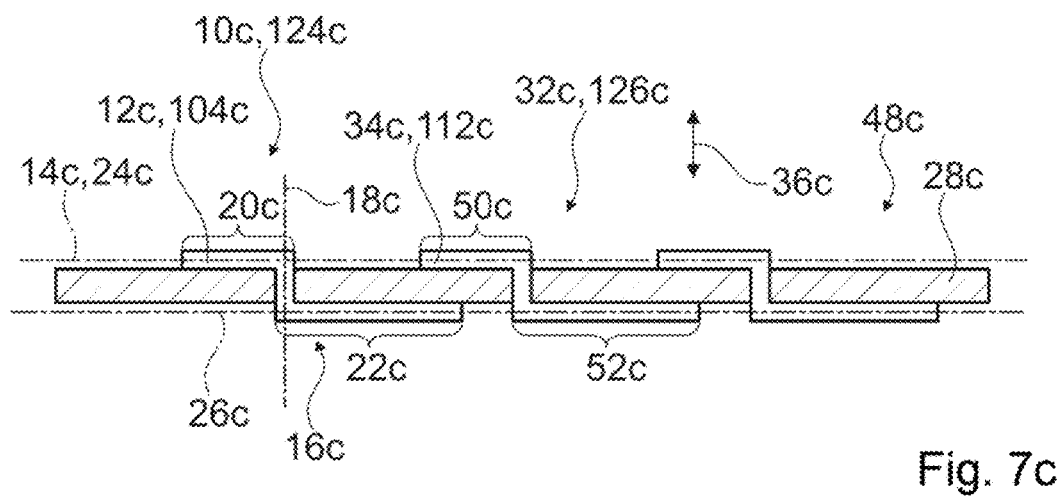
FIG. 7c shows the three induction heating units according to FIG. 7a in a schematic sectional view.

Two further exemplary embodiments of the invention are shown in FIGS. 6a and 7c. The following descriptions are substantially limited to the differences between the exemplary embodiments, wherein relative to components, features and functions remaining the same, reference may be made to the description of the other exemplary embodiments, in particular of FIGS. 1 to 5d. For differentiating between the exemplary embodiments, the letter a in the reference numerals of the exemplary embodiment of FIGS. 1 to 5d is replaced by the letters b and c in the reference numerals of the exemplary embodiments of FIGS. 6a to 7c. Relative to components denoted the same, in particular with reference to components having the same reference numerals, in principle reference may also be made to the drawings and/or the description of the other exemplary embodiments, in particular of FIGS. 1 to 5d.

An induction heating unit 10b of a second exemplary embodiment of an induction hob apparatus is shown in FIGS. 6a and 6b. The induction heating unit 10b comprises an induction heating element 12b. The induction hob apparatus has a hob plane 14b. As shown in FIG. 6c in an exaggerated manner and not to scale, the induction heating element 12b extends at least in a sub-region 16b along a principal extension plane 18b of the sub-region 16b which deviates from the hob plane 14b. The induction heating element 12b has a first portion 20b and a second portion 22b. The first portion 20b extends inside a first principal extension plane 24b. The second portion 22b extends inside a second principal extension plane 26b which is different from the first principal extension plane 24b. An offset between the principal extension planes 24b, 26b is relatively small which is why it may not be identified in FIGS. 6a and 6b and in FIG. 6c is shown in a highly exaggerated manner. The sub-region 16b is arranged between the first portion 20b and the second portion 22b.

As shown further in FIG. 6c, the first principal extension plane 24b and the second principal extension plane 26b run parallel to one another. The induction heating unit 10b comprises a first heating element support 28b. The heating element support 28b is shown merely in FIGS. 6a and 6b and for reasons of clarity not shown in FIG. 6c. The heating element support 28b forms a circuit board. The induction heating element 12b is arranged on the heating element support 28b. For receiving the induction heating element 12b grooves and/or channels are incorporated in the heating element support 28b. The induction heating element 12b is printed onto the heating element support 28b or applied in a different method which seems expedient to the person skilled in the art.

As shown in more detail in FIG. 6b, the induction hob apparatus comprises a further induction heating unit 32b with at least one further induction heating element 34b which has a further first portion 50b and at least one further second portion 52b. In an operational state the further first portion 50b extends inside the first principal extension plane 24b and the further second portion 52b extends inside the second principal extension plane 26b. The induction heating element 12b and the further induction heating element 34b partially overlap in a direction 36b viewed perpendicular to the first principal extension plane 24b.

An induction heating unit 10c of a third exemplary embodiment of an induction hob apparatus is shown in FIGS. 7a and 7b. The induction heating unit 10c comprises an induction heating element 12c. The induction hob apparatus has a hob plane 14c. As shown in FIG. 7c in a schematic sectional view, the induction heating element 12c extends at least in a sub-region 16c along a principal extension plane 18c of the sub-region 16c which deviates from the hob plane 14c. The principal extension plane 18c of the sub-region 16c runs perpendicular to the hob plane 14c. The induction heating element 12c has a first portion 20c and a second portion 22c. The first portion 20c extends inside a first principal extension plane 24c. The second portion 22c extends inside a second principal extension plane 26c which differs from the first principal extension plane 24c. The sub-region 16c is arranged in an overlapping region of the first portion 20c and the second portion 22c.

As shown further in FIG. 7c, the first principal extension plane 24c and the second principal extension plane 26c run at least substantially parallel to one another. The induction heating unit 10c comprises a first heating element support 28c. The heating element support 28c forms a circuit board. The induction heating element 12c is arranged on the heating element support 28c. For receiving the induction heating element 12c, grooves and/or channels are incorporated in the heating element support 28c. The induction heating element 12c is printed on the heating element support 28c or applied in a different method which seems expedient to the person skilled in the art. The induction heating element 12c runs in the first portion 20c on a first side of the heating element support 28c. The induction heating element 12c runs in the second portion 22c on a second side of the heating element support 28c. The first side of the heating element support 28c and the second side of the heating element support 28c are remote from one another. In principle, it is conceivable that the heating element support 28c comprises three and/or more layers in which the induction heating element 12c is arranged. In the sub-region 16c the induction heating element 12c passes through the heating element support 28c from one side to the other side. The sub-region 16c runs in a sickle-shaped manner, viewed perpendicular to the hob plane 14c.

As shown in FIGS. 7a and 7b, a plurality of induction heating units 10a, 32c, 48c are arranged one behind the other on the heating element support 28c. In this connection, however, it is also conceivable that each induction heating unit 10c, 32c, 48c is arranged on a separate heating element support 28c. A further induction heating unit 32c of the induction heating units 10c, 32c, 48c has a further induction heating element 34c which has a further first portion 50c and at least one further second portion 52c. In an operational state the further first portion 50c extends inside the first principal extension plane 24c and the further second portion 52c extends inside the second principal extension plane 26c. The induction heating element 12c and the further induction heating element 34c partially overlap one another in a direction 36c viewed perpendicular to the first principal extension plane 24c.

Figure 8:
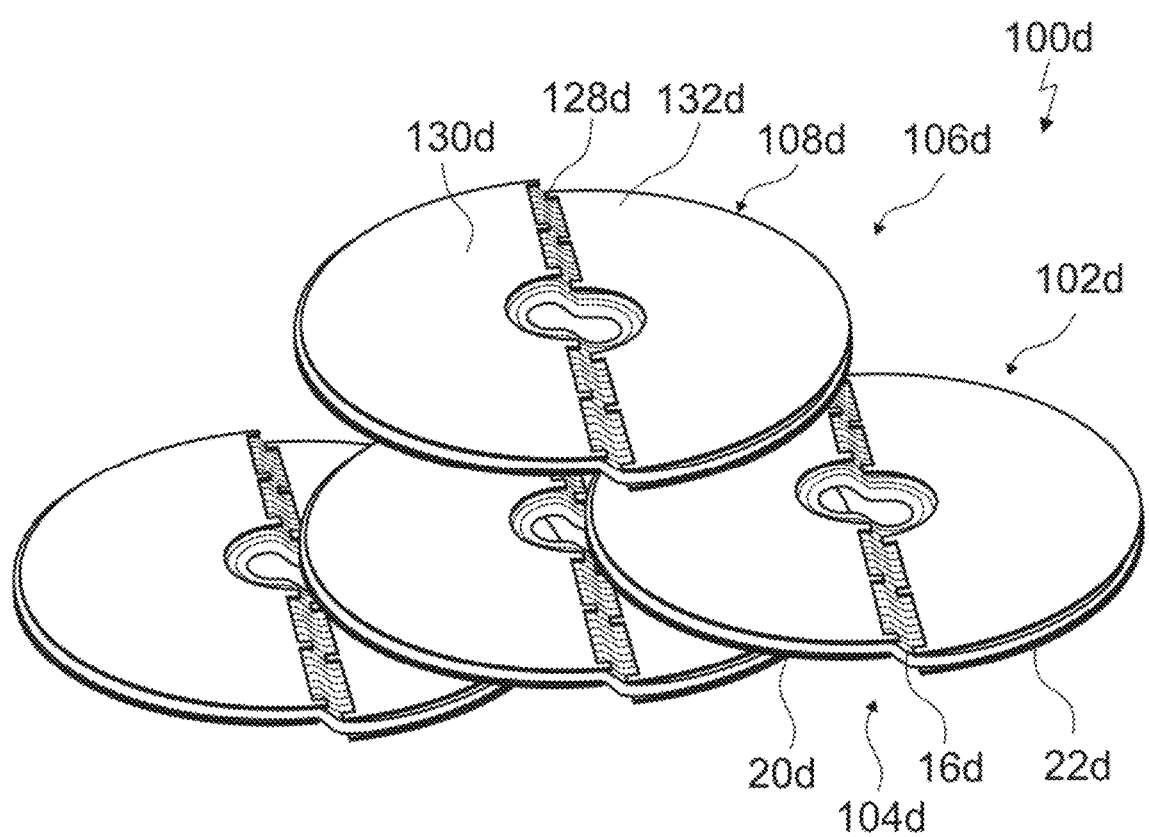
FIG. 8 shows an alternative induction energy transmission system with a supply unit and with a receiving unit in a schematic perspective view.

An alternative induction energy transmission system 100d is shown in FIG. 8. The induction energy transmission system 100d has a supply unit 102d and a receiving unit 106d. The supply unit 102d has a plurality of supplying induction elements 104d. Only three of the supplying induction elements 104d are shown. A portion of the supplying induction elements 104d is arranged in a row. A row of supplying induction elements 104d, of three in number, is shown in FIG. 8. In principle a larger number of supplying induction elements 104d could also be arranged in a row. Only one of the supplying induction elements 104d is described hereinafter.

The supplying induction element 104d has a sub-region 16d which in an operational state is oriented at an angle relative to a plane 110d which is oriented substantially perpendicular to the shortest connection between the supplying induction element 104d and the receiving induction element 108d. The sub-region 104d of the supplying induction element 104d is arranged between a first portion 20d of the supplying induction element 104d and a second portion 22d of the supplying induction element 104d. A first principal extension plane 24d of the first portion 20d and a second principal extension plane 26d of the second portion 22d are oriented substantially parallel to one another and, in particular, to the plane 110d. When viewed perpendicular to the plane 110d two supplying induction elements 104d which are arranged adjacent to one another are arranged so as to overlap one another in some sections.

The receiving unit 106d has a receiving induction element 108d. The receiving induction element 108d has a sub-region 128d. In the operational state, a principal extension plane of the sub-region 128d of the receiving induction element 108d is oriented at an angle relative to the plane 110d. The sub-region 128d of the receiving induction element 108d is arranged between a first portion 130d of the receiving induction element 108d and a second portion 132d of the receiving induction element 108d. A principal extension plane of the first portion 130d of the receiving induction element 108d and a principal extension plane of the second portion 132d of the receiving induction element 108d are oriented substantially parallel to one another and, in particular, arranged offset in a direction which is oriented parallel to the shortest connection between the supplying induction element 104d and the receiving induction element 108d.

Figure 9:
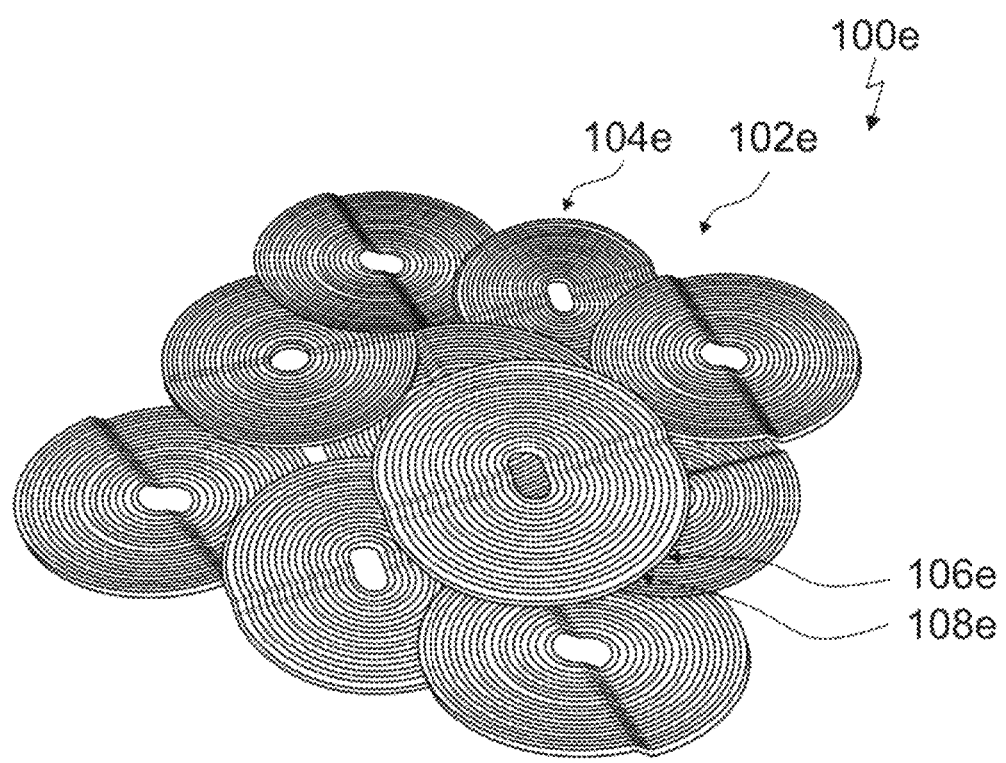
FIG. 9 shows an alternative induction energy transmission system with a supply unit and with a receiving unit in a schematic perspective view.

FIG. 9 shows an alternative induction energy transmission system 100e which differs, in particular, from the exemplary embodiment in FIG. 8 by a configuration of a supply unit 102e. The induction energy transmission system 100e has a supply unit 102e and a receiving unit 106e. The supply unit 102e has a plurality of supplying induction elements 104e. The supplying induction elements 104e are arranged in the form of a matrix and form, in particular, a part of a matrix hob. In each case, when viewed perpendicular to a plane 110e which is oriented substantially perpendicular to the shortest connection between a supplying induction element 104e located closest to a receiving induction element 108e of the receiving unit 106e and the receiving induction element 108e, one of the supplying induction elements 104e is arranged so as to overlap in some sections with at least two, in particular with at least three, and advantageously with at least four adjacently arranged supplying induction elements 104e.

The supplying induction element 104e and/or in particular the receiving induction element 108e has an oval shape, when viewed perpendicular to the plane 110e. In the present exemplary embodiment, the supplying induction element 104e and/or in particular the receiving induction element 108e has a circular shape, when viewed perpendicular to the plane 110e.

Figure 10A:
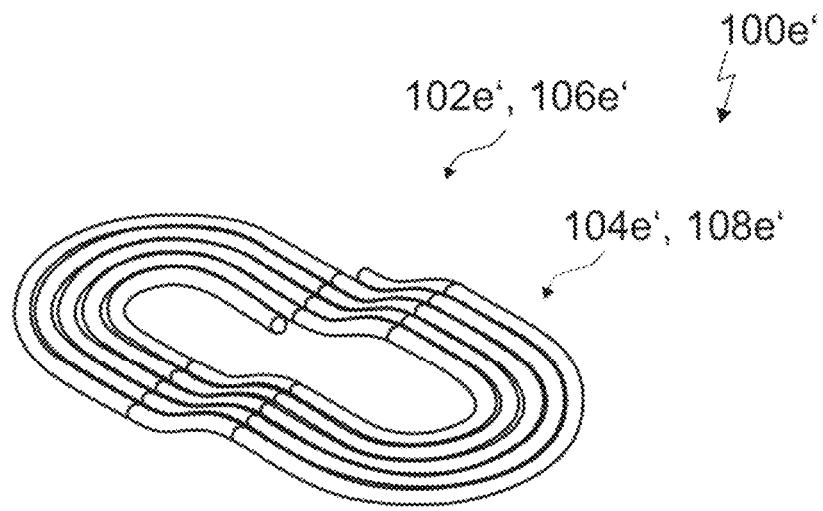
FIG. 10a shows an alternative induction energy transmission system in a schematic perspective view.
Figure 10B:
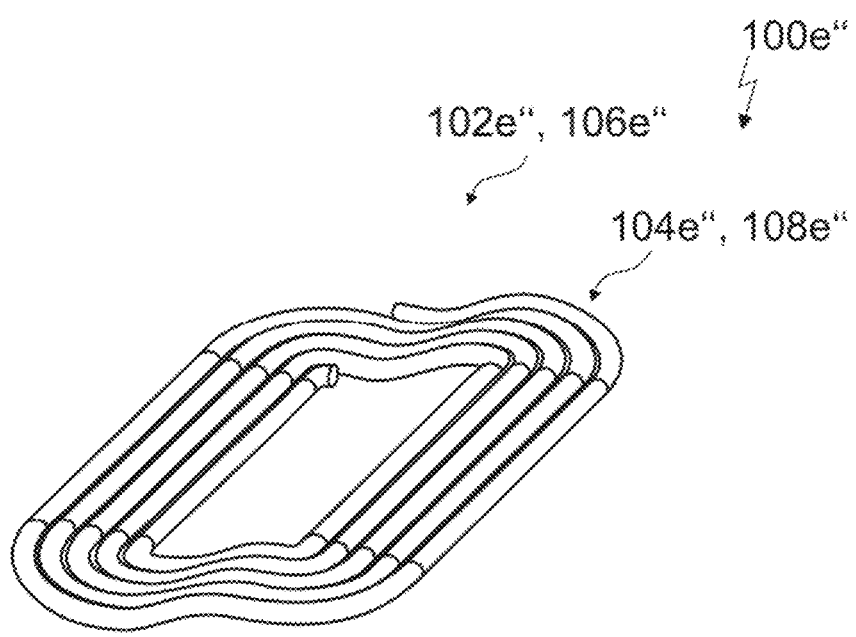
FIG. 10b shows an alternative induction energy transmission system in a schematic perspective view.

As an alternative to a circular shape, at least one portion of the supplying induction elements 104e' and/or the receiving induction element 108e' could have an elliptical shape, when viewed perpendicular to the plane 110e' (see FIGS. 10a and 10b).

The supplying induction element 104e' and/or the receiving induction element 108e' could, for example, be bent along a short axis of the elliptical shape (see FIG. 10a). A heating conductor running in the sub-region 16e' of the supplying induction element 104e' and/or in the sub-region 128e' of the receiving induction element 108e' could run, for example, parallel to a long axis of the elliptical shape.

The supplying induction element 104e" and/or the receiving induction element 108e" could be bent, for example, along a long axis of the elliptical shape (see FIG. 10b). A heating conductor running in the sub-region 16e" of the supplying induction element 104e" and/or in the sub-region 128e" of the receiving induction element 108e" could run, for example, parallel to a short axis of the elliptical shape.

Figure 11A:
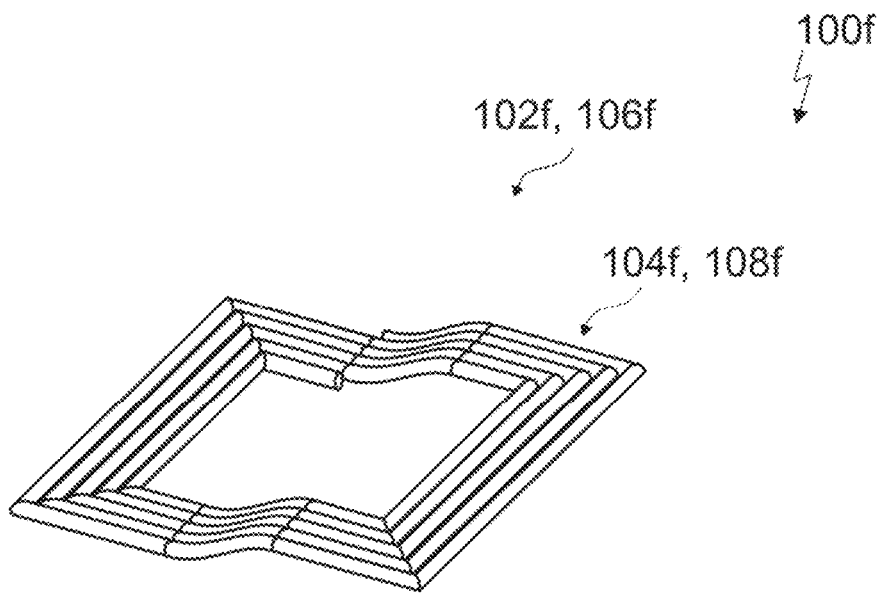
FIG. 11a shows an alternative induction energy transmission system in a schematic perspective view.
Figure 11B:
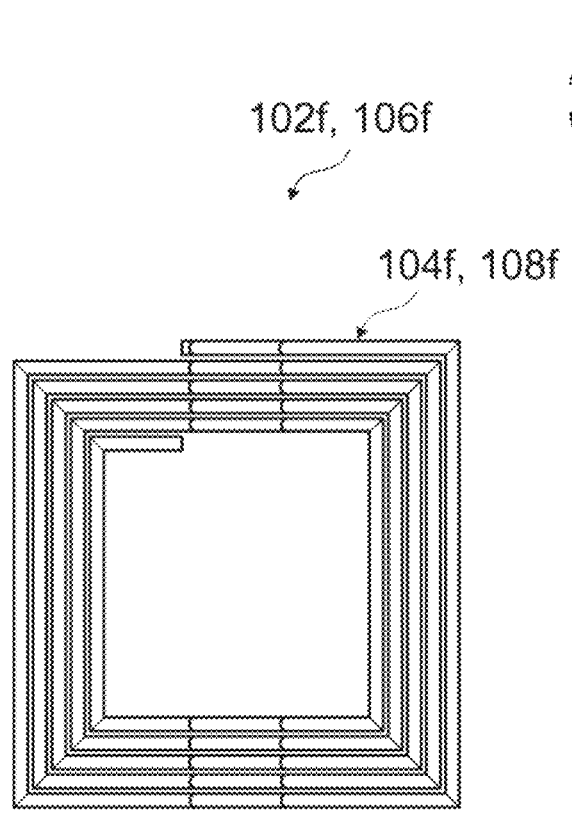
FIG. 11b shows the induction energy transmission system of FIG. 11a in a schematic plan view.

FIGS. 11a and 11b show in each case an alternative induction energy transmission system 100f which, in particular, differs from the previous exemplary embodiments by a configuration of a supply unit 102f. The induction energy transmission system 100f has a supply unit 102f and a receiving unit 106f. The supply unit 102f has at least one supplying induction element 104f. The receiving unit 106f has at least one receiving induction element 108f.

The supplying induction element 104f and/or the receiving induction element 108f has a rectangular shape, when viewed perpendicular to a plane 110f, which in particular is oriented substantially perpendicular to the shortest connection between a supplying induction element 104f located closest to the receiving induction element 108f and the receiving induction element 108f. In the present exemplary embodiment, the supplying induction element 104f and/or in particular the receiving induction element 108f has a square shape, when viewed perpendicular to the plane 110f.

Figure 11C:
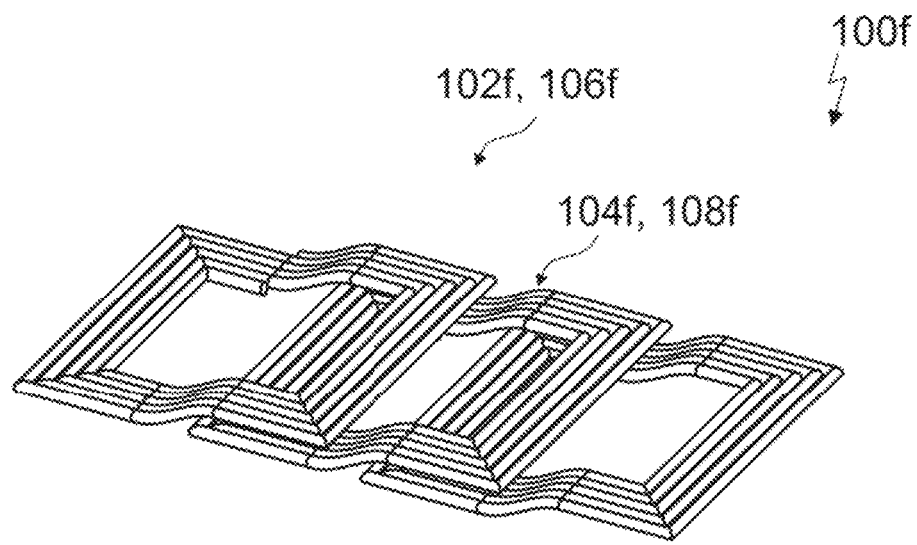
FIG. 11c shows the induction energy transmission system of FIG. 11a in a first embodiment in a schematic perspective view.
Figure 11D:
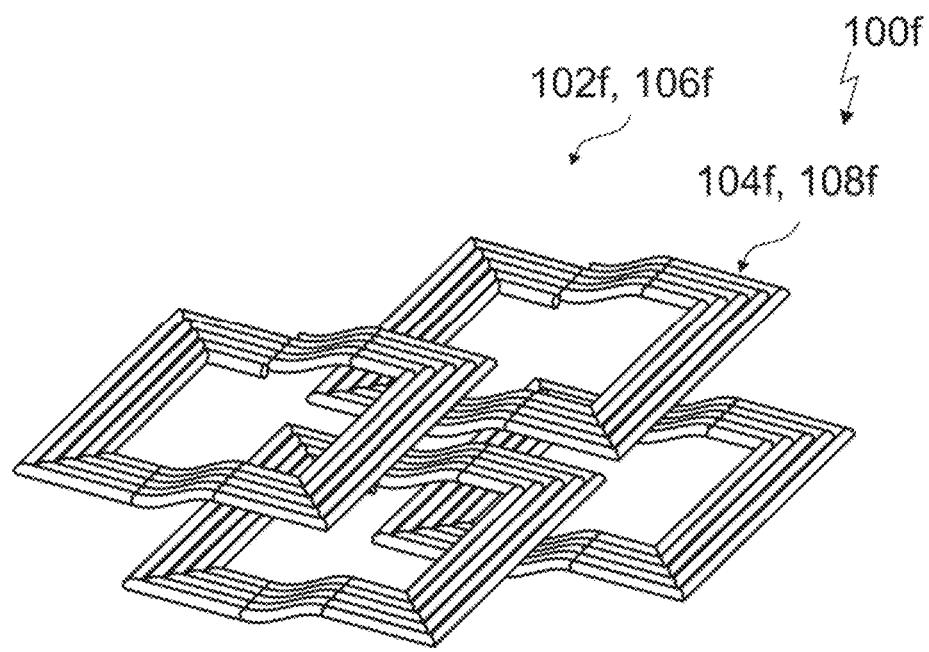
FIG. 11d shows the induction energy transmission system of FIG. 11a in a second embodiment in a schematic perspective view.

The supply unit 102f could have, for example, a plurality of in particular equally configured supplying induction elements 104f. Alternatively or additionally the receiving unit 106f, for example, could have a plurality of in particular equally configured receiving induction elements 108f. At least one portion of the supplying induction elements 104f and/or at least one portion of the receiving induction element 108f could be arranged, for example, in a row, when viewed perpendicular to the plane 110f (see FIG. 11c). Alternatively or additionally, for example, at least one portion of the supplying induction elements 104f and/or at least one portion of the receiving induction elements 108f could be arranged in the form of a matrix, when viewed perpendicular to the plane 110f (see FIG. 11d).

Figure 11E:
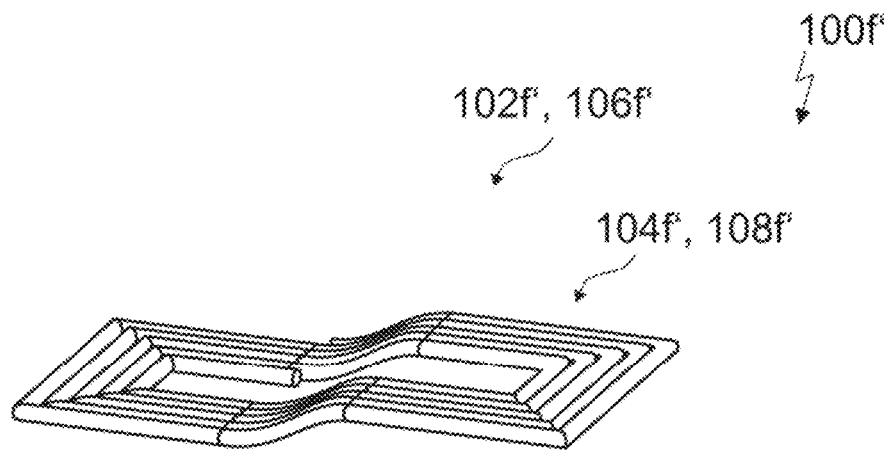
FIG. 11e shows an alternative induction energy transmission system in a schematic perspective view and FIG. 11f shows an alternative induction energy transmission system in a schematic perspective view.
Figure 11F:
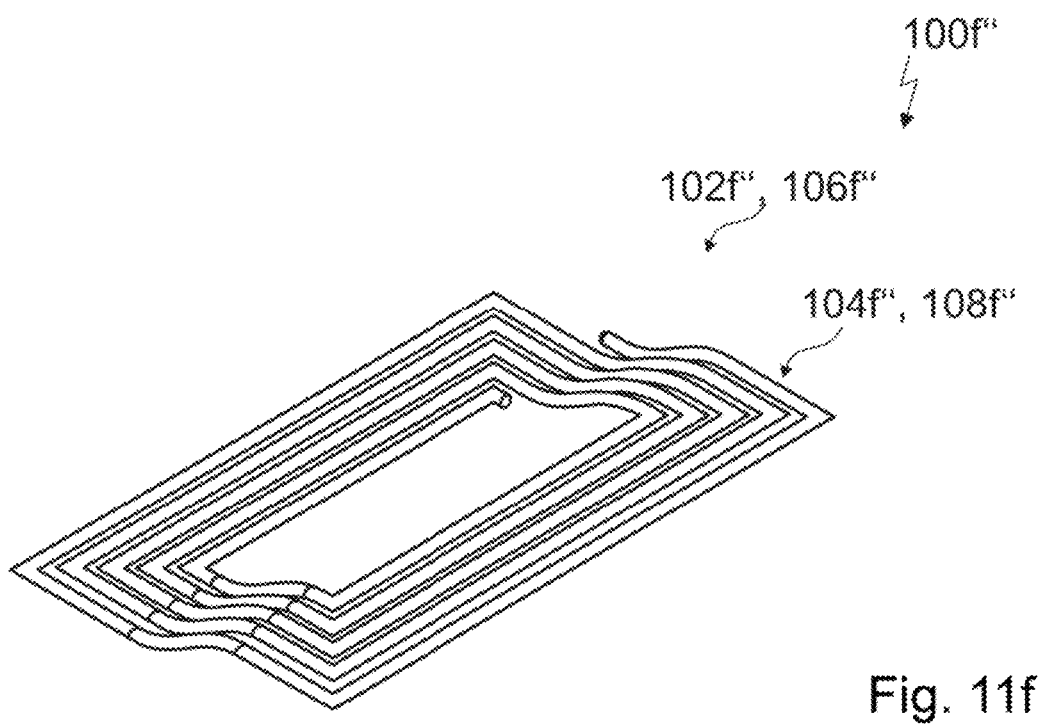

As an alternative to a square shape, at least one of the supplying induction elements 104f' and/or at least one of the receiving induction elements 108f' could have, in particular, a rectangular shape deviating from a square shape, when viewed perpendicular to the plane 110f' (see FIGS. 11e and 11f).

The supplying induction element 104*f'* and/or the receiving induction element 108*f'* could, for example, be bent along a short axis of the rectangular shape (see FIG. 11*e*). A heating conductor running in the sub-region 16*f'* of the supplying induction element 104*f'* and/or in the sub-region 128*f'* of the receiving induction element 108*f'* could run, for example, parallel to a long axis of the rectangular shape.

The supplying induction element 104*f"* and/or the receiving induction element 108*f"* could be bent, for example, along a long axis of the rectangular shape (see FIG. 11*f*). A heating conductor running in the sub-region 16*f"* of the supplying induction element 104*f"* and/or in the sub-region 128*f"* of the receiving induction element 108*f"* could run, for example, parallel to a short axis of the rectangular shape.

The invention claimed is:

1. An induction energy transmission system, comprising:
   a supply unit including a supplying induction element for supplying energy; and
   a receiving unit including a receiving induction element that receives energy from the supplying induction element when in an operational state a shortest connection between the supplying induction element and the receiving induction element is minimal,
   wherein the supplying induction element comprises a coil, and the coil comprises at least two continuous inductor loops, the inductor loops comprising:
      a first portion defining a first principal extension plane and a second portion defining a second principal extension plane which differs from the first principal extension plane, and
      a sub-region in which the inductor loops are bent and/or permanently plastically deformed to be oriented at an angle relative to the first principal extension plane, the second principal extension plane, and a plane at least substantially perpendicular to the shortest connection between the supplying induction element and the receiving induction element.

2. The induction energy transmission system of claim 1, constructed in the form of an induction cooking system.

3. The induction energy transmission system of claim 1, wherein the first principal extension plane and the second principal extension plane are oriented at least substantially parallel to one another, and a principal extension plane of the sub-region of the inductor loops connects the first principal extension plane and the second principal extension plane, wherein the first portion of the inductor loops and the second portion of the inductor loops have a same center.

4. The induction energy transmission system of claim 1, wherein the sub-region of the inductor loops is bent and/or permanently plastically deformed to be oriented at the angle relative to the first principal extension plane, the second principal extension plane, and the plane at least substantially perpendicular to the shortest connection between the supplying induction element and the receiving induction element.

5. The induction energy transmission system of claim 1, wherein the supply unit comprises two further supplying induction elements each having a coil, each coil comprising at least two continuous inductor loops, the inductor loops comprising:
   a first portion which extends at least substantially inside the first principal extension plane,
   a second portion which extends at least substantially inside the second principal extension plane, and
   a sub-region in which the inductor loops are bent and/or permanently plastically deformed to be oriented at an angle relative to the first principal extension plane and the second principal extension plane,
   wherein the supplying induction element and the two further supplying induction elements are arranged in a row such that each sub-region extends in a direction of an axis of extension of the row and is oriented parallel to the sub-region of the inductor loops of the supplying induction element the two further supplying induction elements.

6. The induction energy transmission system of claim 5, wherein the supplying induction element and the two further supplying induction elements are arranged so as to overlap one another at least in one section, when viewed perpendicular to the plane, the sub-regions of the two further supplying induction elements and the sub-region of the supplying induction element are aligned to form a row with sub-regions of additional supplying induction elements.

7. The induction energy transmission system of claim 1, wherein the supplying induction element has an oval shape, when viewed perpendicular to the plane.

8. The induction energy transmission system of claim 1, wherein the supplying induction element has a rectangular shape, when viewed perpendicular to the plane.

9. The induction energy transmission system of claim 1, wherein the supply unit is configured as a hob.

10. The induction energy transmission system of claim 1, wherein the receiving unit is configured as a positioning unit which has a receiving space for receiving food.

11. A method for operating an induction energy transmission system, said method comprising:
    supplying energy by a supplying induction element of a supply unit; and
    receiving by a receiving induction element of a receiving unit the energy from the supplying induction element when in an operational state a shortest connection between the supplying induction element and the receiving induction element is minimal,
    wherein the supplying induction element comprises a coil, and the coil comprises at least two continuous inductor loops, the inductor loops comprising:
       a first portion defining a first principal extension plane and a second portion defining a second principal extension plane which differs from the first principal extension plane, and
       a sub-region in which the inductor loops are bent and/or permanently plastically deformed to be oriented at an angle relative to the first principal extension plane, the second principal extension plane, and a plane at least substantially perpendicular to the shortest connection between the supplying induction element and the receiving induction element.

12. The method of claim 11, wherein the first principal extension plane and the second principal extension plane are oriented at least substantially parallel to one another, and a principal extension plane of the sub-region of the coil connects the first principal extension plane the second principal extension plane, and the principal extension plane of the sub-region is oriented at an angle of approximately 45 degrees relative to the first principal extension plane and the second principal extension plane.

13. The method of claim 11, wherein the sub-region of the coil is bent, folded and/or permanently plastically deformed to be oriented at the angle relative to the first principal extension plane, the second principal extension plane, and the plane at least substantially perpendicular to the shortest connection between the supplying induction element and the receiving induction element, and the sub-region is arranged at least for the most part between the first portion and the second portion.

14. The method of claim 11, wherein the supply unit comprises a further supplying induction element having a coil, the coil comprising:
   a first portion which extends at least substantially inside the first principal extension plane,
   a second portion which extends at least substantially inside the second principal extension plane, and
   a sub-region in which the coil is oriented parallel to the sub-region of a coil of at least two additional supplying induction elements.

15. The method of claim 14, wherein the supplying induction element and the further supplying induction element are arranged so as to overlap one another at least in one section, when viewed perpendicular to the plane, and a center of the supplying induction element and the further supplying induction element are arranged to form a row.

16. The method of claim 11, wherein the supply unit is configured as a hob.

17. The method of claim 11, wherein the receiving unit is configured as a positioning unit which has a receiving space for receiving food.

18. The induction energy transmission system of claim 1, wherein a principal extension plane of the sub-region of the coil extends at an approximately 45 degrees angle relative to the first principal extension plane and the second principal extension plane.

19. The method of claim 11, wherein an insulating layer is arranged on at least the first portion of the coil and the second portion of the coil, and the coil is bent, folded and/or permanently plastically deformed twice to form the sub-region of the coil oriented at the angle relative to the first principal extension plane and the second principal extension plane.

* * * * *